US010363643B2

(12) United States Patent
Grisley

(10) Patent No.: US 10,363,643 B2
(45) Date of Patent: Jul. 30, 2019

(54) MORTISE AND TENON JIG

(71) Applicant: Leigh Industries, Ltd., Port Coquitlam (CA)

(72) Inventor: Kenneth M. Grisley, Coquitlam (CA)

(73) Assignee: LEIGH INDUSTRIES, LTD. (CA)

( * ) Notice: Subject to any disclaimer, the term of this patent is extended or adjusted under 35 U.S.C. 154(b) by 0 days.

(21) Appl. No.: 16/002,923

(22) Filed: Jun. 7, 2018

(65) Prior Publication Data

US 2018/0354086 A1 Dec. 13, 2018

Related U.S. Application Data

(60) Provisional application No. 62/516,306, filed on Jun. 7, 2017.

(51) Int. Cl.
*B23Q 9/00* (2006.01)
*B27F 1/08* (2006.01)
*B27F 5/02* (2006.01)
*B27C 5/10* (2006.01)

(52) U.S. Cl.
CPC .............. *B23Q 9/0014* (2013.01); *B27C 5/10* (2013.01); *B27F 1/08* (2013.01); *B27F 5/02* (2013.01); *B23Q 2703/02* (2013.01)

(58) Field of Classification Search
CPC ...... B27F 1/00; B27F 1/02; B27F 1/04; B27F 1/08; B27F 1/12; B27F 1/16; B27F 5/00; B27F 5/02; B27F 5/12
See application file for complete search history.

(56) References Cited

U.S. PATENT DOCUMENTS

| 4,479,523 | A | | 10/1984 | Peterson et al. |
| 4,595,040 | A | | 6/1986 | Glisman |
| 4,787,432 | A | | 11/1988 | Williams |
| 5,123,463 | A | | 6/1992 | Grisley |
| 5,285,832 | A | | 2/1994 | Gibson |
| 5,862,848 | A | * | 1/1999 | Beall .................... B23Q 9/0042 144/144.1 |

(Continued)

FOREIGN PATENT DOCUMENTS

WO 2018225013 A1 12/2018

OTHER PUBLICATIONS

General Tools, Mortice & Tenon Jig #870 4 of 5 Cutting Tenon, Mar. 7, 2012, ^https://www.youtube.com/watch?v=DP_MejGgppQ^ Year: 2012).*

(Continued)

*Primary Examiner* — Matthew Katcoff
(74) *Attorney, Agent, or Firm* — Kilpatrick Townsend & Stockton LLP

(57) ABSTRACT

A mortise and tenon jig includes a base plate, a router support plate attached to an upper surface of the base plate such that the router support plate includes an opening, and a guide attached to the router support plate. The guide may include a first end and a second end. The first end includes a mortise guide surface, and the second end includes a tenon guide surface. The mortise and tenon jig also includes a first configuration where the mortise guide surface is aligned with the opening and a second configuration where the tenon guide surface is aligned with the opening.

20 Claims, 17 Drawing Sheets

(56) References Cited

U.S. PATENT DOCUMENTS

| | | | | |
|---|---|---|---|---|
| 6,076,575 A * | 6/2000 | Harkness | .................. | B27F 1/12 |
| | | | | 144/144.1 |
| 6,112,783 A * | 9/2000 | Newman | .............. | B23Q 9/0042 |
| | | | | 144/144.1 |
| 8,016,005 B1 | 9/2011 | Weinstein | | |
| 8,534,329 B2 * | 9/2013 | Grisley | ..................... | B27F 1/12 |
| | | | | 144/144.1 |

OTHER PUBLICATIONS

Axminster Tools & Machinery, Leigh FMT Mortice & Tenon Jig—Production Routing, Jul. 7, 2016, ^https://www.youtube.com/watch?v=T8OcinQaYeo^ (Year: 2016).*

Trend Routing Technology, Trend Mortise & Tenon Jig, Oct. 18, 2009, ^https://www.youtube.com/watch?v=OT3i6CNEjUo^ (Year: 2009).*

International Search Report and Written Opinion from related PCT Application PCT/IB2018/054127, dated Oct. 1, 2018, 6 pages.

* cited by examiner

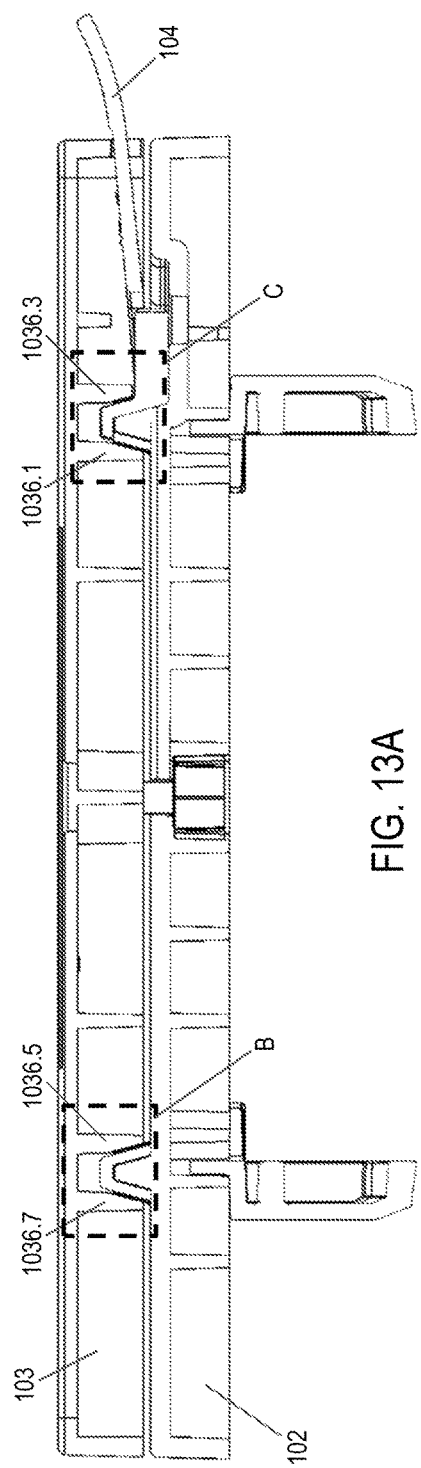
FIG. 13A
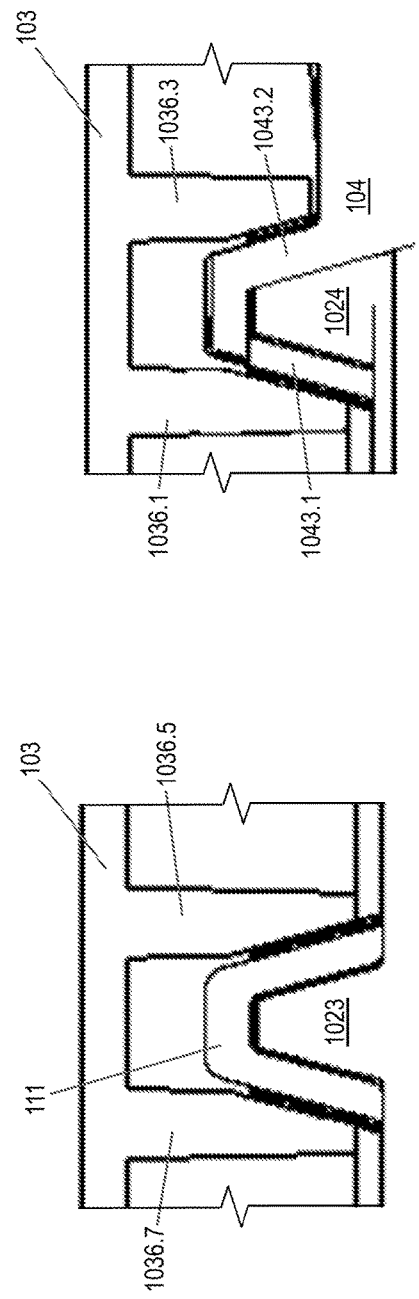
FIG. 13C
FIG. 13B

MORTISE AND TENON JIG

CROSS REFERENCE TO RELATED APPLICATION

This application is related to and claims the benefit of U.S. Provisional Application No. 62/516,306 ("the '306 application"), filed on Jun. 7, 2017, entitled MORTISE AND TENON JIG. The '306 application is hereby incorporated in its entirety by this reference.

FIELD

Mortise and tenon jigs and methods for operation.

BACKGROUND

Routers and other cutting tools are often used with cutting guides that guide the movement of the tool's cutter with respect to a work piece, such as a piece of wood. Existing devices for guiding cutting tools, such as jigs for mortise and tenon joints, typically only cut either a mortise or a tenon (not both) and/or require complicated processes for arranging and preparing for each cutting operation such that subsequent steps of the process require repeated or additional steps for arranging and preparing the device. There is a need for improved devices and methods for mortise and tenon operations where the device can be arranged once for all cutting operations.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a mortise and tenon jig comprises: a base plate; a router support plate attached to an upper surface of the base plate, the router support plate comprising an opening; and a guide attached to the router support plate, wherein: the guide comprises a first end and a second end; the first end comprises a mortise guide surface; the second end comprises a tenon guide surface; and the mortise and tenon jig comprises a first configuration where the mortise guide surface is aligned with the opening and a second configuration where the tenon guide surface is aligned with the opening.

According to certain embodiments of the present invention, a woodcutting jig for use with a handheld router comprises: a base plate; a router support plate attached to an upper surface of the base plate, the router support plate comprising an opening; a front mount attached to a lower surface of the base plate, the front mount comprising a front surface acting as a reference surface; a lock portion extending between the base plate and the router support plate, the lock portion comprising an unlocked configuration and a locked configuration; and a guide attached to the router support plate, wherein: with the lock portion in the unlocked configuration, the router support plate can move relative to the base plate along an axis; and with the lock portion in the locked configuration, the router support plate and the base plate are secured to one another.

According to certain embodiments of the present invention, a method for cutting a woodworking joint comprises: securing a first work piece to a jig, the jig comprising: a base plate; a router support plate attached to an upper surface of the base plate, the router support plate comprising an opening; and a guide attached to the router support plate, wherein: the guide comprises a first end and a second end; and the jig comprises a first configuration where the first end of the guide is approximately aligned with the opening and a second configuration where the second end of the guide is approximately aligned with the opening; cutting a mortise in the first work piece with the jig in the first configuration; removing the guide from the router support plate; attaching the guide to the router support plate in the second configuration; securing a second work piece to the jig; and cutting waste material of the second work piece to form at least a portion of a tenon with the jig in the second configuration.

According to certain embodiments of the present invention, a method for cutting a woodworking joint comprises: securing a work piece to a jig, the jig comprising a base to which the work piece is secured and a router support; moving the router support relative to the base along a first axis to align the router support relative to the work piece; securing a tenon guide in an opening of the router support, the tenon guide comprising a first tenon guide surface, the opening comprising a second tenon guide surface; when the first tenon guide surface is aligned with an intended location for a first portion of a tenon, using a router to form the first portion of the tenon in the work piece while supporting the router on the router support and guiding movement of the router using the first tenon guide surface; moving the router support along the first axis to align the second tenon guide surface with an intended location for a second portion of the tenon; and when the second tenon guide surface is aligned with the intended location for the second portion of the tenon, using the router to form the second portion of the tenon in the work piece while supporting the router on the router support and guiding the movement of the router using the second tenon guide surface.

According to certain embodiments of the present invention, a method for cutting a woodworking joint, the method comprises: securing a work piece to a jig, the jig comprising a base to which the work piece is secured and a router support; moving the router support relative to the base along a first axis to align the router support relative to the work piece, and then locking a first lock to secure the router support in an aligned position; when the router support is in the aligned position, using a router to form a first portion of a tenon in the work piece while supporting the router on the router support and guiding movement of the router using a first tenon guide surface; unlocking a second lock, and, while the first lock is locked and the second lock is unlocked, moving the router support along the first axis a pre-defined distance to a second aligned position, and then locking the second lock; when the router support is in the second aligned position, using the router to form a second portion of the tenon in the work piece while supporting the router on the router support and guiding the movement of the router using a second tenon guide surface.

BRIEF DESCRIPTION OF THE DRAWINGS

FIG. 13A is a cross section view of the mortise and tenon jig of FIG. 1A.

FIGS. 13B and 13C are enlarged partial cross section views of the mortise and tenon jig of FIG. 13A.

DETAILED DESCRIPTION

This section describes one example of a mortise and tenon jig system and method for use in accordance with the present invention. Other embodiments of the invention are also possible, and this detailed description is not intended to be limiting on the scope of the present invention.

Figure 1A:
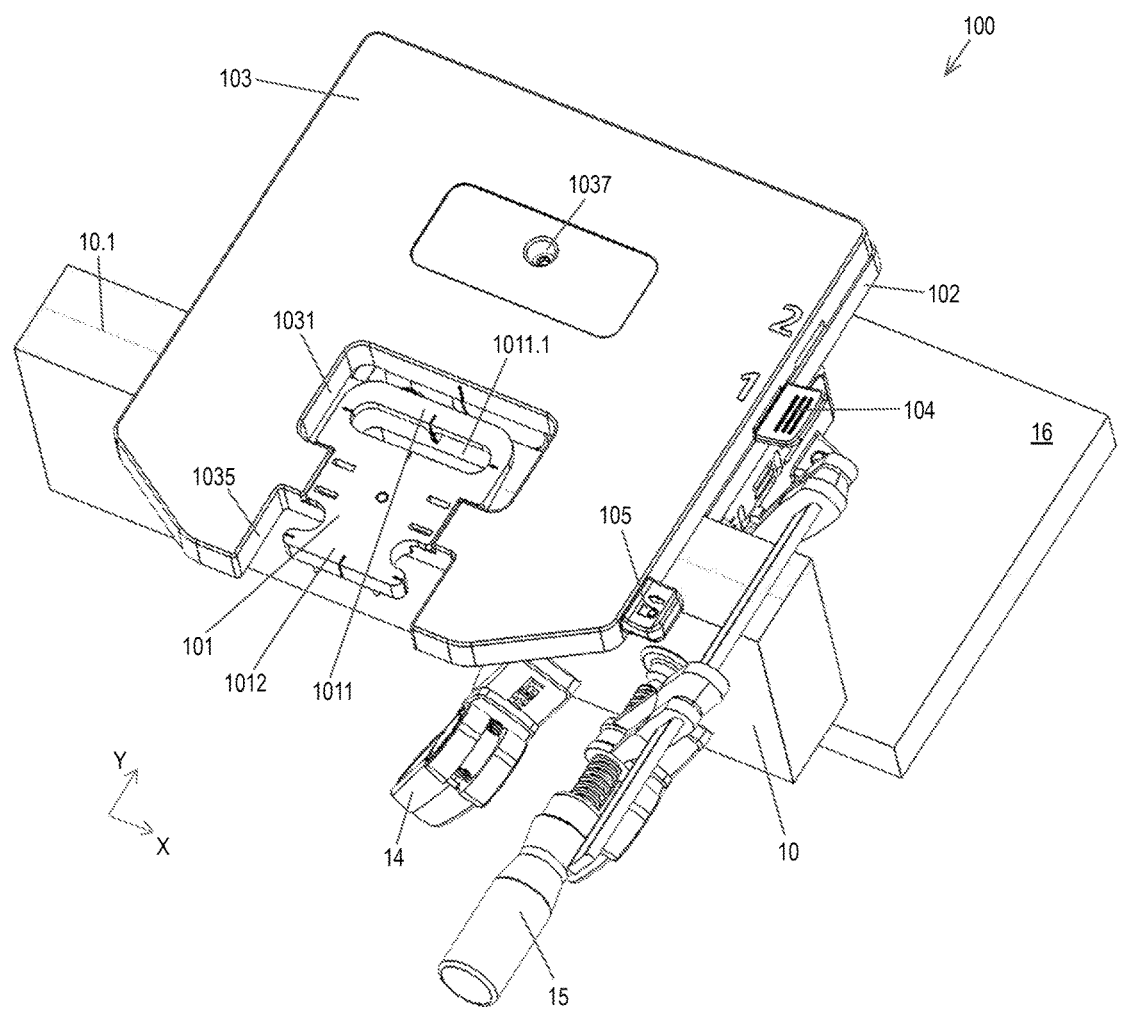
FIG. 1A is a front right perspective view of a mortise and tenon jig, the jig set up for mortising.
Figure 1B:
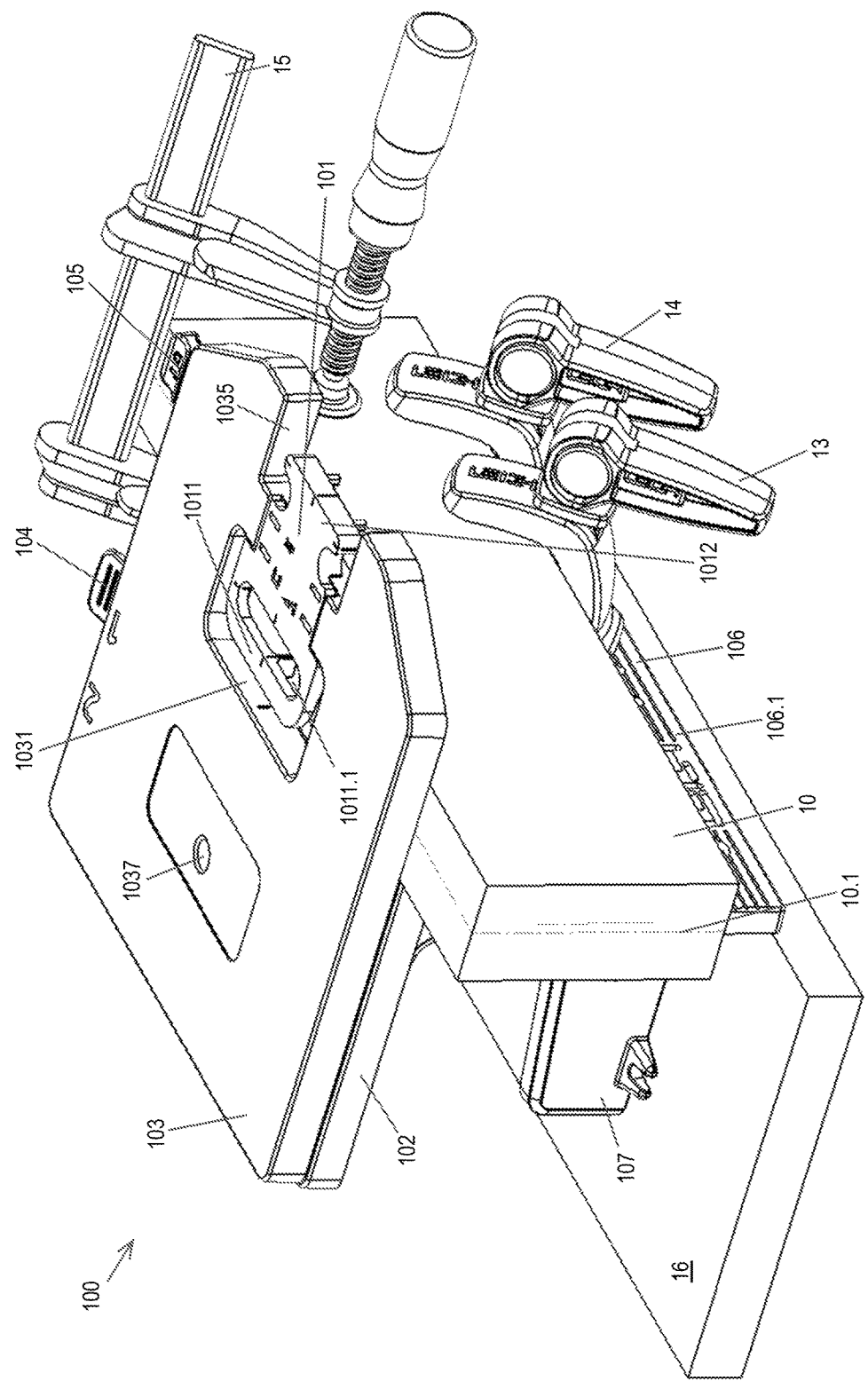
FIG. 1B is a front left perspective view of the mortise and tenon jig of FIG. 1A, also in the mortising set up.
Figure 2A:
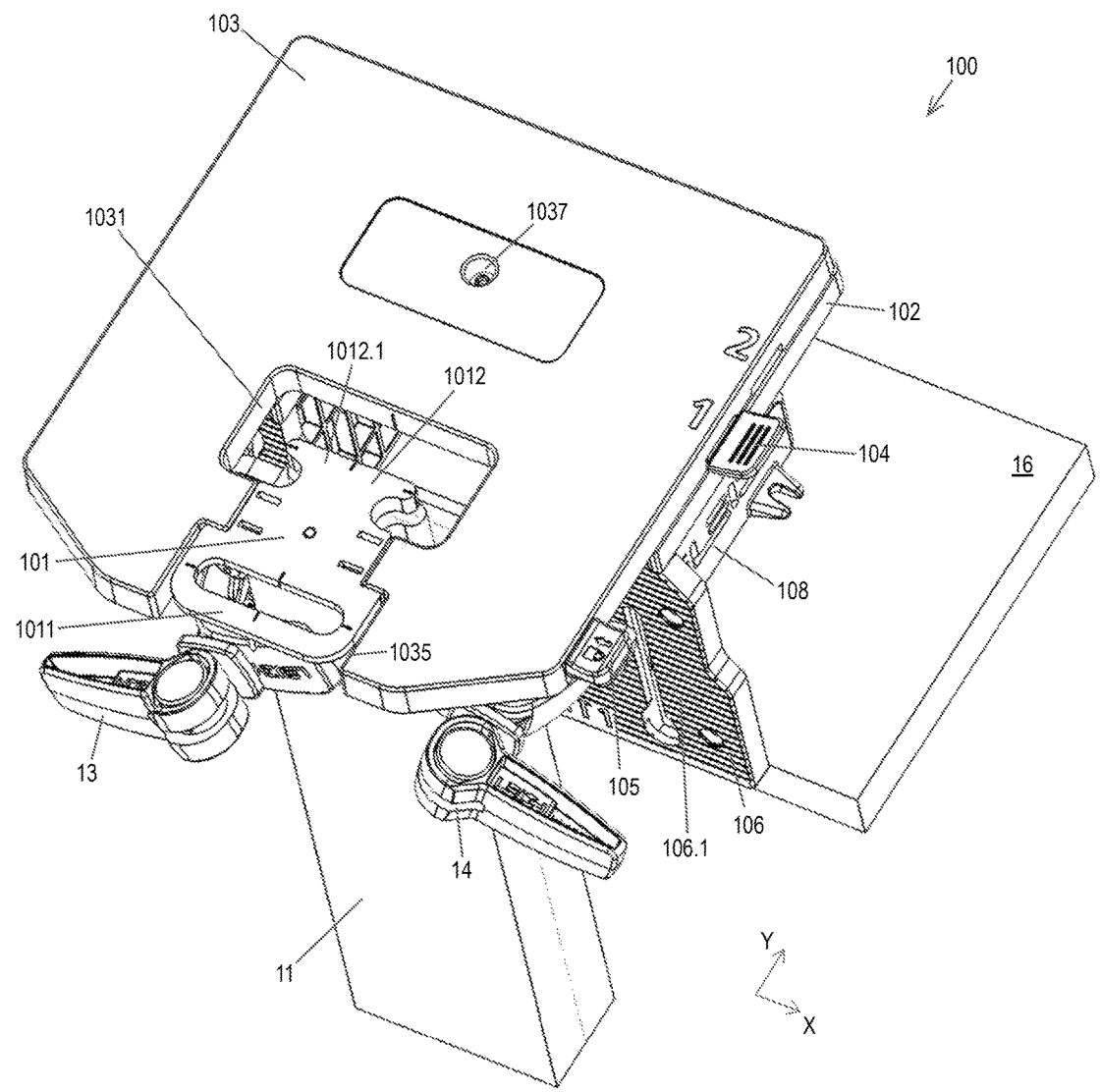
FIG. 2A is another front right perspective view of the mortise and tenon jig of FIG. 1A, the jig set up for a first step in a tenoning procedure.
Figure 2B:
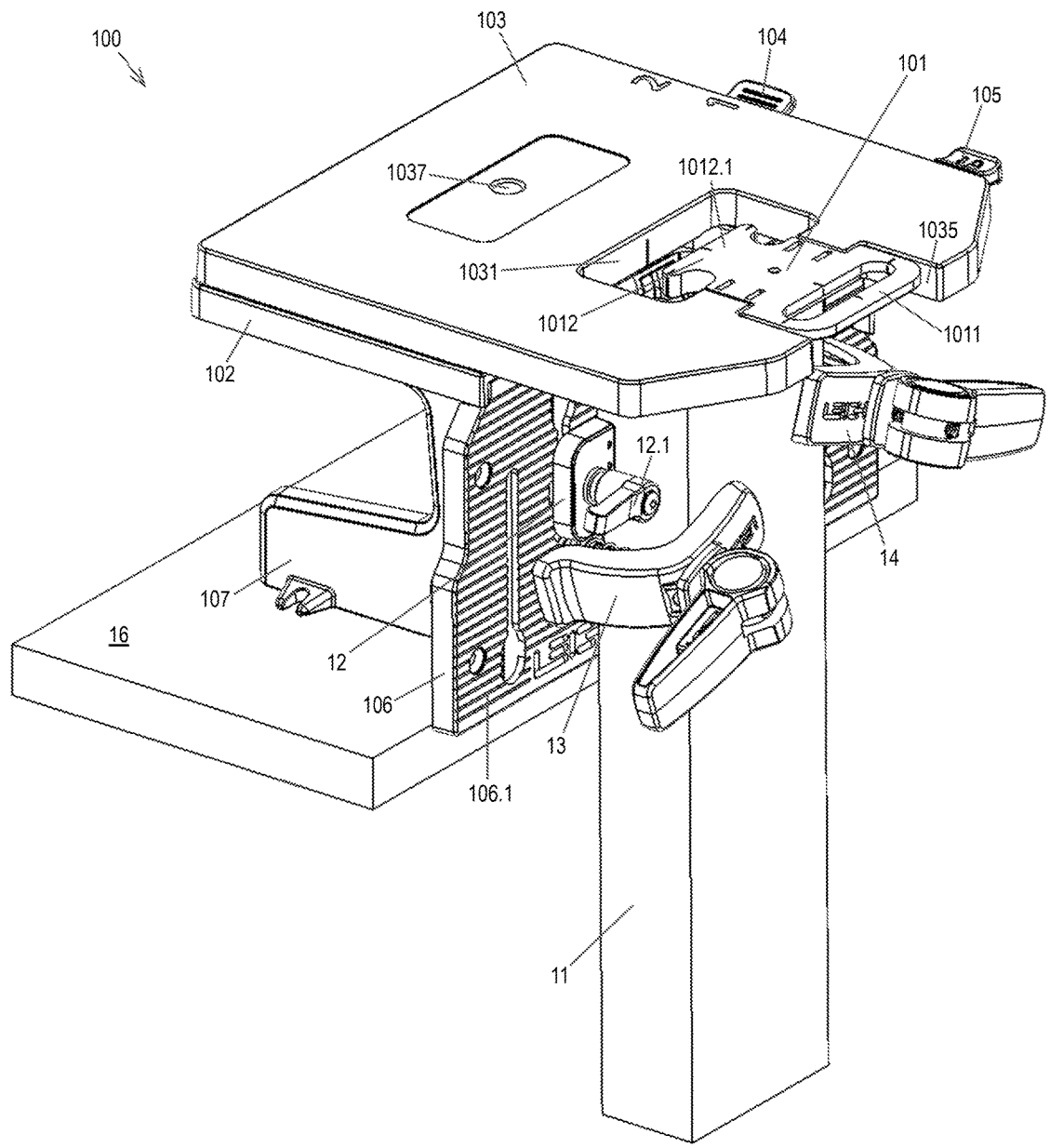
FIG. 2B is a front left perspective view of the mortise and tenon jig of FIG. 2A.

The mortise and tenon system 100 includes two horizontal plates including a base plate 102 and a router support plate 103. The router support plate 103 attaches to an upper surface of the base plate 102 and provides a flat surface for interfacing with the base of a woodworking tool (e.g., a router). The router support plate 103 may include at least one opening and/or notch (see 1031 and 1035 in the drawings). The mortise and tenon system 100 also includes a guide 101 such that, when the guide 101 is attached to the mortise and tenon system 100, the guide 101 and the router support plate 103 form a continuous planer surface. The router base sits on the planer surface such that the cutting tool (e.g., the router bit) extends through and/or below the router base and the planer surface. The guide bushing of the router (which is fixed to the router base and has a known offset from the router bit) interfaces with vertical surfaces of the guide 101. The guide 101 includes at least one of a mortising guide and a tenoning guide. For example, the guide 101 shown in the drawings includes a mortising guide 1011.1 (e.g., a hole), such that the inner surface of the hole is a mortise guide surface. The guide 101 also includes a tenoning guide 1012.1 (e.g., a protrusion), such that the outer surface of the protrusion is a tenon guide surface. As described in greater detail below, the guide 101 can be reversed to switch between a mortise configuration (FIGS. 1A and 1B) and a tenon configuration (FIGS. 2A and 2B).

In addition to the configuration of the guide 101, the mortise and tenon system 100 is configured such that the router support plate 103 is movable/slidable relative to the base plate 102. The position of the router support plate 103 can be adjusted by first loosening plate securing lever 109, which allows the router support plate 103 to move such that the guide (for the mortising guide and a tenoning guide) can move to align with the desired depth position of a work piece (i.e., along the Y-axis). Once the router support plate 103 is in the appropriate position, the plate securing lever 109 can be tightened to constrain the router support plate 103 and the base plate 102 relative to one another.

Based on the adjustment using plate securing lever 109 described above, the router support plate 103 is positioned and secured relative to the base plate 102 (and a work piece). In some cases, the next step is to cut a mortise in a first work piece 10 using the mortising guide 1011.1 as a template for the guide bushing of the router (see configuration in FIGS. 1A and 1B). After cutting the mortise, the guide 101 is reversed such that the tenoning guide 1012.1 is aligned with the opening 1031 of the router support plate 103 and a second work piece 11 is secured to the mortise and tenon system 100. When the second work piece 11 is secure, the tenoning guide 1012.1 can be used as a template for the guide bushing of the router to begin cutting the tenon with the router support plate 103 in a first position relative to the base plate 102 (see FIGS. 2A and 2B). To complete the tenon cutting operation, the router support plate lever 104 is engaged to move the router support plate 103 from the first position (shown in FIGS. 2A and 2B) to the second position (shown in FIGS. 3A and 3B). When the router support plate 103 is in the second position (FIGS. 3A and 3B), the guide bushing of the router uses a second tenon guide surface (e.g., the rear surface 1032 of the opening 1031) to cut the remainder of the tenon.

FIGS. 1A-14C illustrate one example of a mortise and tenon jig system 100. In this example, the mortise and tenon jig system 100 includes a base plate 102, a router support plate 103, and a guide 101. The router support plate 103 is attached to an upper surface of the base plate 102 and includes an opening 1031 and a notch 1035. In some situations, the router support plate 103 is capable of sliding along the Y-axis (see FIG. 1A) relative to base plate 102 (i.e., the depth of the work piece). The guide 101 is removably attached to the router support plate 103 such than one end of the guide 101 is approximately aligned with opening 1031. The guide 101 includes a first end 1011, which includes a mortising guide 1011.1 (e.g., a hole), and a second end 1012, which includes a tenoning guide 1012.1 (e.g., a protrusion). The hole 1011.1, as shown in FIGS. 1A, 1B, 6A, and 6B, approximately corresponds to a desired shape of a mortise. In other words, the guide bushing of a router uses the surface of the hole 1011.1 as a template for cutting the mortise. The protrusion 1012.1, as shown in FIGS. 2A-3B, 6A, and 6B, approximately corresponds to a desired shape of at least part of a tenon. In other words, the guide bushing of a router uses the surface of the protrusion 1012.1 as a template for cutting at least part of the tenon.

In some embodiments, to provide a structural frame with sufficient rigidity for repeated cutting operations, the mortise and tenon jig system 100 includes a front mount 106, a left side mount 107, and/or a right side mount 108. As shown in FIGS. 2B, 3B, 7, and 8, the front mount 106 is attached to a front edge of the base plate 102. The left side mount 107 and right side mount 108 are each attached to a lower surface of the base plate 102 and to a rear surface of the front mount 106. For additional rigidity, the left side mount 107 and/or the right side mount 108 may be attached to a platform 16 as shown in FIGS. 1A-3B (or may be directly attached to a table or workbench).

The mortise and tenon jig system 100 has a first configuration (e.g., a mortise configuration) where the first end 1011 of the guide 101 (which includes hole 1011.1) is approximately aligned with opening 1031 of the router support plate 103. The mortise and tenon jig system 100 is shown in the first configuration in FIGS. 1A and 1B, which is the configuration for cutting a mortise. To prepare for a mortise cutting operation, a first work piece 10 is moved laterally along the X-axis (see FIG. 1A) until the center of the desired mortise location is aligned with the centerlines 1011.2 (see FIGS. 6A and 6B) and the first work piece 10 is secured to a reference surface 106.1 of the front mount 106 using clamps 13, 14, and/or 15. After the first work piece 10 is clamped to the front mount 106, the plate securing lever 109 (see FIGS. 7 and 8) is loosened such that router support plate 103 can be moved in a depth direction along the Y-axis relative to base plate 102 to align the center of the desired mortise location with the centerlines 1011.3 (see FIGS. 6A and 6B). When the router support plate 103 is in position (along the Y-axis), the plate securing lever 109 is tightened to constrain movement between the router support plate 103 and the base plate 102. For example, if line 10.1 represents a center of the mortise, the router support plate 103 is moved until line 10.1 is aligned with centerlines 1011.3. After the plate securing lever 109 is tightened, the mortise can be cut using a handheld router using the hole 1011.1 as a template. Although the procedure above describes adjusting the mortise and tenon jig system 100 laterally (X-axis) and then depth adjustment (Y-axis), this order may be reversed.

For movement along the Y-axis between the router support plate 103 and the base plate 102, to ensure alignment and to limit unwanted movement (i.e., to minimize twist and/or movement along the X-axis), the mortise and tenon jig system 100 may include multiple alignment features. In some embodiments, a fastener extends through hole 1037 (see FIGS. 1A-5A) of the router support plate 103 and through slot 1022 (see FIGS. 9A and 9B) of the base plate 102. In addition, the protrusions 1023 and 1024 (see FIGS. 9A and 13A-13C) of the base plate 102 may engage ribs on the underside of the router support plate 103. As described below in the context of the router support plate lever 104, the ribs 1036.1 and 1036.3 of the router support plate 103 may be in sliding contact with the protrusion 1024 of the base plate 102 where, in some cases, components of the router support plate lever 104 are disposed between the ribs 1036.1, 1036.3 and the protrusion 1024. As shown in FIG. 13B, the ribs 1036.5 and 1036.7 of the router support plate 103 may be in sliding contact with the protrusion 1023 of the base plate 102 where, in some cases, a spacer 111 may be disposed between the ribs 1036.5, 1036.7 and the protrusion 1023. The spacer 111 (and relevant portions of the router support plate lever 104) may be a low friction material or may include a coating to minimize friction and to ensure ease of movement between the router support plate 103 and the base plate 102.

If the offset between the exterior surface and the center of the mortise is the same as the offset between the exterior surface and the center of the tenon, the plate securing lever 109 may not need to be adjusted for the remaining steps of the mortise and tenon joint. For example, if the first and second work pieces 10 and 11 have the same thickness and the mortise and tenon are both centered in the thickness of the respective components, the plate securing lever 109 should be adjusted one time for the entire process.

The mortise and tenon jig system 100 has a second configuration where the second end 1012 of the guide 101 (which includes protrusion 1012.1) is approximately aligned with opening 1031 of the router support plate 103. To alter the mortise and tenon jig system 100 between the first and second configuration, the guide 101 is removed from the router support plate 103, turned approximately 180° (or flipper over), and reattached to the router support plate 103 (i.e., compare FIG. 1A showing the first configuration with FIG. 2A showing the second configuration).

Figure 4:
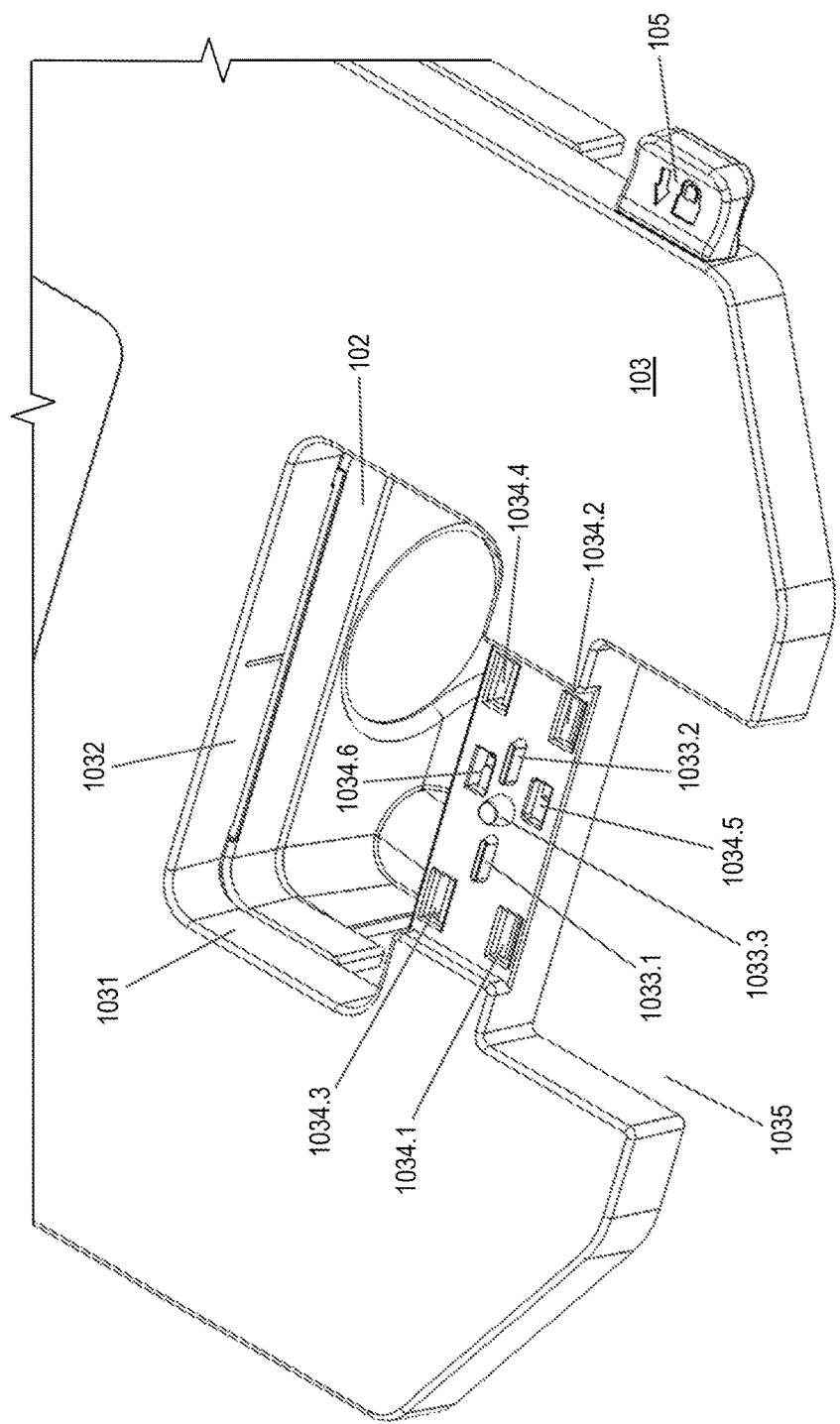
FIG. 4 is a top partial perspective view of the mortise and tenon jig of FIG. 1A.
Figure 5A:
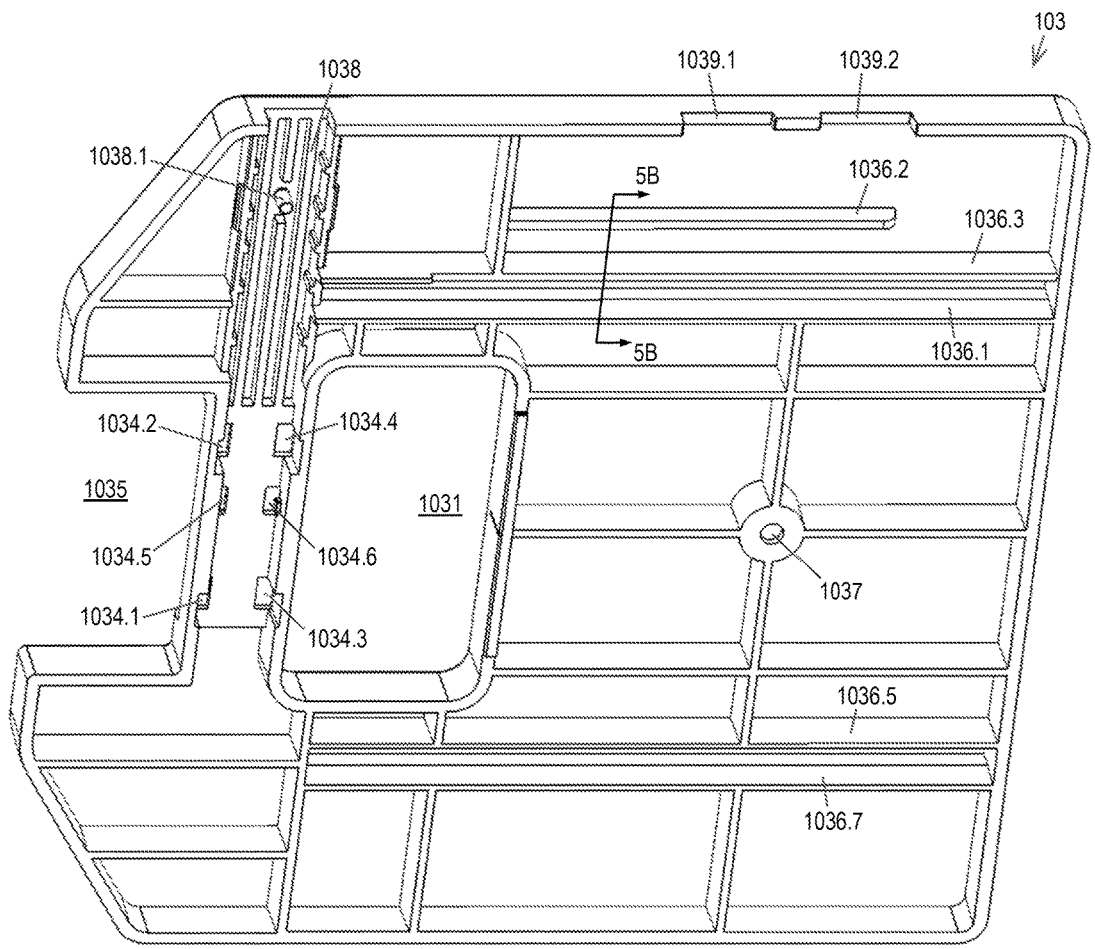
FIG. 5A is a bottom perspective view of a router support plate of the mortise and tenon jig of FIG. 1A.
Figure 5B:
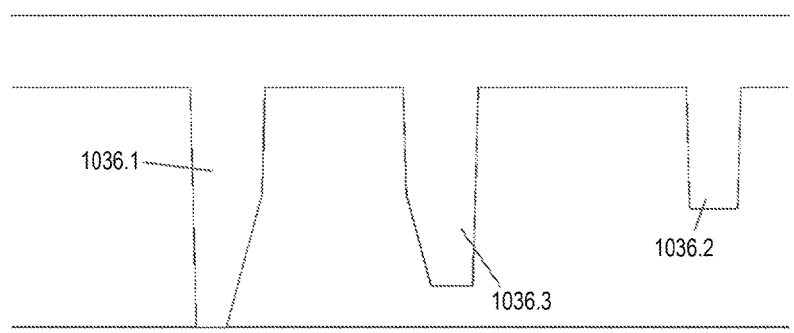
FIG. 5B is partial cross section view of the router support plate of FIG. 5A.

As shown in FIGS. 4 and 5A, the router support plate 103 includes at least one protrusion 1033 and/or at least one recess 1034 to attach and/or align the guide 101 with respect to the router support plate 103. The router support plate 103 may include a left side protrusion 1033.1, a right side protrusion 1033.2, and a center protrusion 1033.3. In some embodiments, the left and right side protrusions 1033.1, 1033.2 each have an approximately rectangular cross section that tapers to a smaller size as it extends away from the surface of the router support plate 103. The ends or corners of the rectangular cross section of the left and right side protrusions 1033.1, 1033.2 may be curved. The center protrusion 1033.3 may have a circular cross section and an overall conical shape.

Figure 6A:
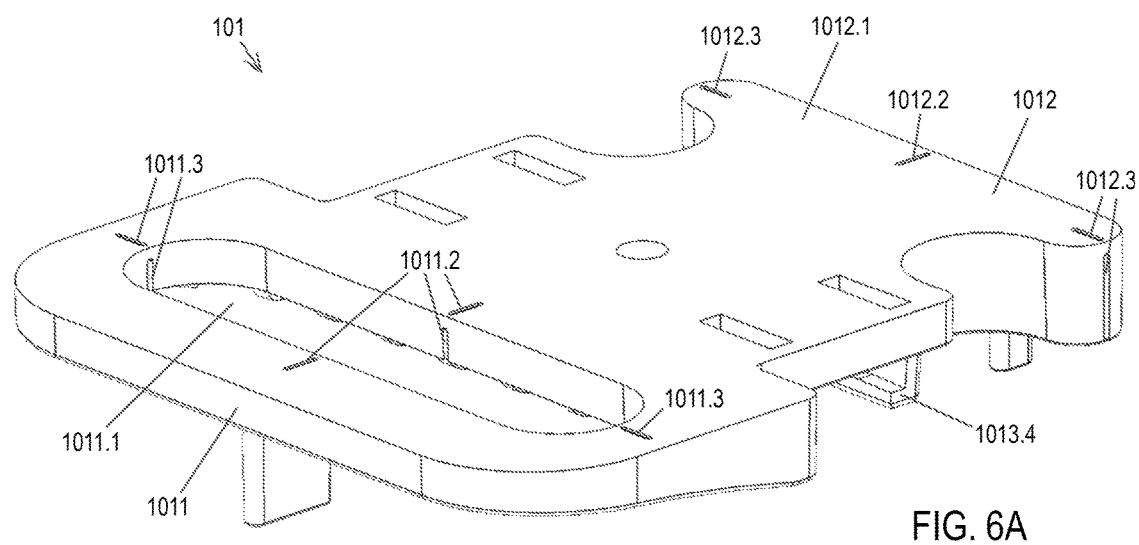
FIG. 6A is a top perspective view of a guide of the mortise and tenon jig of FIG. 1A.
Figure 6B:
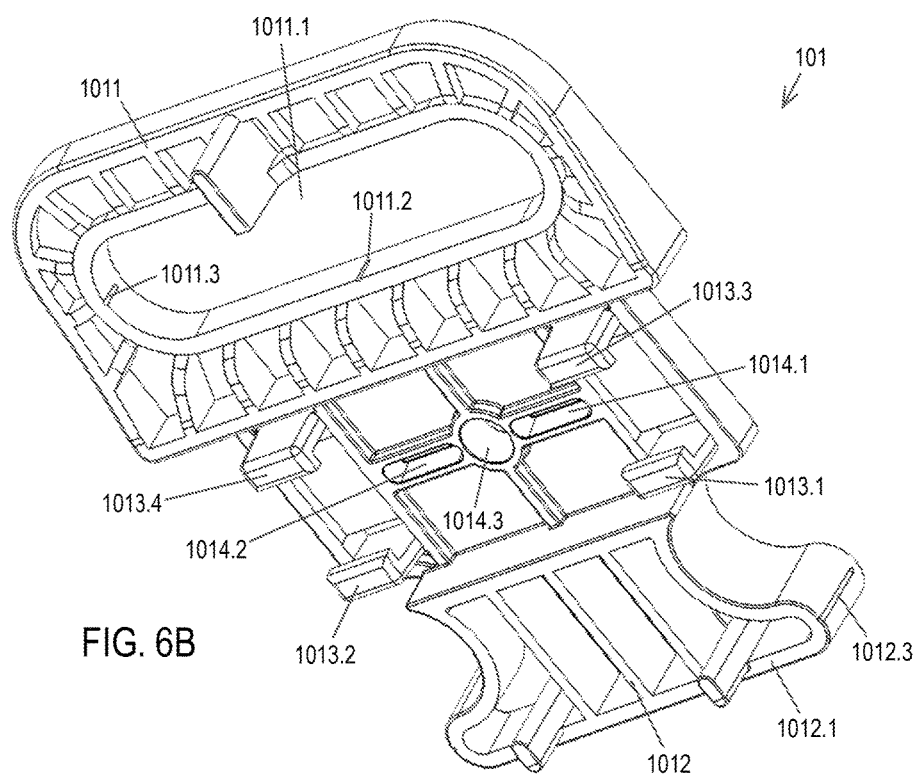
FIG. 6B is a bottom perspective view of the guide of FIG. 6A.

As shown in FIG. 6B, the guide 101 may include at least one recess 1014 that corresponds to the protrusion(s) 1033 of the router support plate 103. To attach the guide 101 in the first configuration (for mortise operations), the left side protrusion 1033.1 of the router support plate 103 engages a first recess 1014.1 of the guide 101, the right side protrusion 1033.2 of the router support plate 103 engages a second recess 1014.2 of the guide 101, and the center protrusion 1033.3 of the router support plate 103 engages a third recess 1014.3 of the guide 101. To attach the guide 101 in the second configuration (for tenon operations), the left side protrusion 1033.1 of the router support plate 103 engages the second recess 1014.2 of the guide 101, the right side protrusion 1033.2 of the router support plate 103 engages the first recess 1014.1 of the guide 101, and the center protrusion 1033.3 of the router support plate 103 engages the third recess 1014.3 of the guide 101.

In addition to (or in lieu of) the at least one protrusion 1033, the router support plate 103 may include at least one recess 1034 for interfacing with the guide 101 (see FIGS. 4 and 5A). The router support plate 103 may include a left front recess 1034.1, a right front recess 1034.2, a left rear recess 1034.3, and a right rear recess 1034.4. In some embodiments, the recesses 1034.1-1034.4 each have an approximately rectangular cross section and extend through an entire thickness of the router support plate 103. In some cases, the router support plate 103 may also include a front central recess 1034.5 and a rear central recess 1034.6.

As shown in FIGS. 6A and 6B, guide 101 may include at least one protrusion 1013 that corresponds to the recess(es) 1034 of the router support plate 103. When attaching the guide 101 in the first configuration (for mortise operations), a first protrusion 1013.1 of the guide 101 engages the left front recess 1034.1 of the router support plate 103, a second protrusion 1013.2 of the guide 101 engages the right front recess 1034.2 of the router support plate 103, a third protrusion 1013.3 of the guide 101 engages the left rear recess 1034.3 of the router support plate 103, and a fourth protrusion 1013.4 of the guide 101 engages the right rear recess 1034.4 of the router support plate 103. To attach the guide 101 in the second configuration (for tenon operations), the first protrusion 1013.1 of the guide 101 engages the right rear recess 1034.4 of the router support plate 103, the second protrusion 1013.2 of the guide 101 engages the left rear recess 1034.3 of the router support plate 103, the third protrusion 1013.3 of the guide 101 engages the right front recess 1034.2 of the router support plate 103, and the fourth protrusion 1013.4 of the guide 101 engages the left front recess 1034.1 of the router support plate 103. The router support plate 103 and the guide 101 may include any number, shape, combination, and arrangement of recesses/protrusions and/or any other appropriate object.

In certain embodiments, the guide 101 is secured in position using a guide attachment portion 105 (see FIGS. 12A and 12B), which is inserted into channel 1038 of the router support plate 103 (see FIG. 5A). The channel 1038 extends through the router support plate 103 under the protrusion(s) 1033 and/or the recess(es) 1034. The guide attachment portion 105 includes an engaged configuration and a disengaged configuration, which are defined by the relationship between pin 1038.1 and slot 1052 (see FIGS. 5A, 12A, and 12B). In the engaged configuration, the guide attachment portion 105 slides along the length of channel 1038 (typically by moving handle 1051) such that the proximal end 1052.1 of the slot 1052 contacts or is located adjacent to pin 1038.1. When the guide 101 is attached to the router support plate 103 and the guide attachment portion 105 is in the engaged configuration, the distal tongues 1053.1 and 1053.3 of the guide attachment portion 105 engage the protrusions 1013 of the guide 101 extending through left front recess 1034.1 and left rear recess 1034.3 of the router support plate 103. In addition, the proximal tongues 1053.2 and 1053.4 of the guide attachment portion 105 engage the protrusions 1013 of the guide 101 extending through right front recess 1034.2 and right rear recess 1034.4 of the router support plate 103.

To move the guide attachment portion 105 to the disengaged configuration, the handle 1051 is pulled away from the guide 101 such that the distal end 1052.2 of the slot 1052 contacts or is located adjacent to pin 1038.1. When the guide 101 is attached to the router support plate 103 and the guide attachment portion 105 is moved to the disengaged configuration, the distal tongues 1053.1 and 1053.3 of the guide attachment portion 105 disengage from the protrusions 1013 of the guide 101 and move to a portion of the channel 1038 located between the left side recesses (1034.1, 1034.3) and the right side recesses (1034.2, 1034.4). In addition, the proximal tongues 1053.2 and 1053.4 of the guide attachment portion 105 disengage from the protrusions 1013 of the guide 101 such that open areas 1054.1 and 1054.2 of the guide attachment portion 105 are aligned with the right side recesses 1034.2 and 1034.4, respectively. When the guide attachment portion 105 is in the disengaged configuration, the guide 101 can be removed or lifted away from the router support plate 103. In some embodiments, the guide attachment portion 105 may include a biasing mechanism (including, for example, one or more of a detent, a spring, or any other appropriate mechanism) that biases the guide attachment portion 105 toward at least one of the engaged configuration and the disengaged configuration.

The mortise and tenon jig system 100 is shown in the second configuration in FIGS. 2A-3B, which is the configuration for cutting a tenon. To prepare for a tenon cutting operation, the second work piece 11 is moved laterally along the X-axis (see FIGS. 2A and 3A) until the center of the desired tenon location is aligned with the centerlines 1012.2 (see FIG. 6A) and the second work piece 11 is secured to the reference surface 106.1 of the front mount 106 using clamps 13 and/or 14. A side stop 12 (see FIGS. 2B and 3B) may be used to secure a lateral surface of the second work piece 11 (by tightening handle 12.1), and may create a reference surface for repeated/additional operations for components with similar dimensions as second work piece 11. If the router support plate 103 was adjusted for depth along the Y-axis relative to base plate 102 using the plate securing lever 109 (as described above) and the first and second work pieces 10 and 11 are consistent with one another, no other adjustments are necessary before beginning tenon cutting operations. After the second work piece 11 is secured, at least part of the tenon can be cut using a handheld router using the protrusion 1012.1 as a template. In other words, waste material adjacent to the desired tenon can be cut. In some embodiments, because the handheld router cannot follow the entire perimeter of the protrusion 1012.1 (because one side of the protrusion 1012.1 is attached to guide 101), only a portion of the waste material for the tenon can be cut away with the mortise and tenon jig system 100 in the configuration/position shown in FIGS. 2A and 2B. In particular, based on the shape of protrusion 1012.1, the handheld router can cut one face cheek (see wide edge at centerline 1012.2 in FIG. 6A) and the two end cheeks (see narrower edges with centerlines 1012.3 in FIG. 6A). In other words, with the mortise and tenon jig system 100 in the configuration/position shown in FIGS. 2A and 2B, three of the four sides of the tenon can be cut.

Figure 3A:
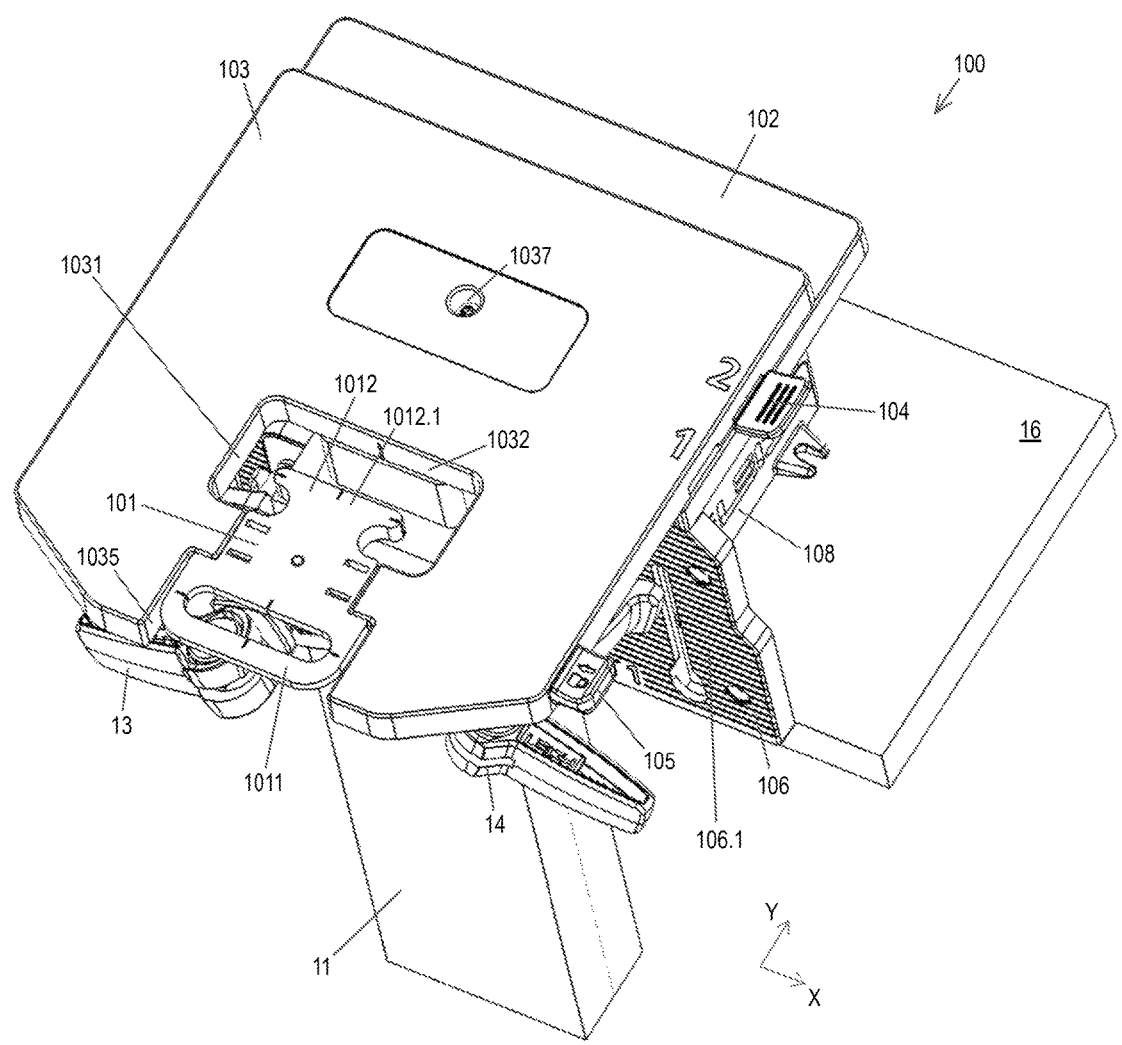
FIG. 3A is another front right perspective view of the mortise and tenon jig of FIG. 1A, the jig set up for a second step in a tenoning procedure.
Figure 3B:
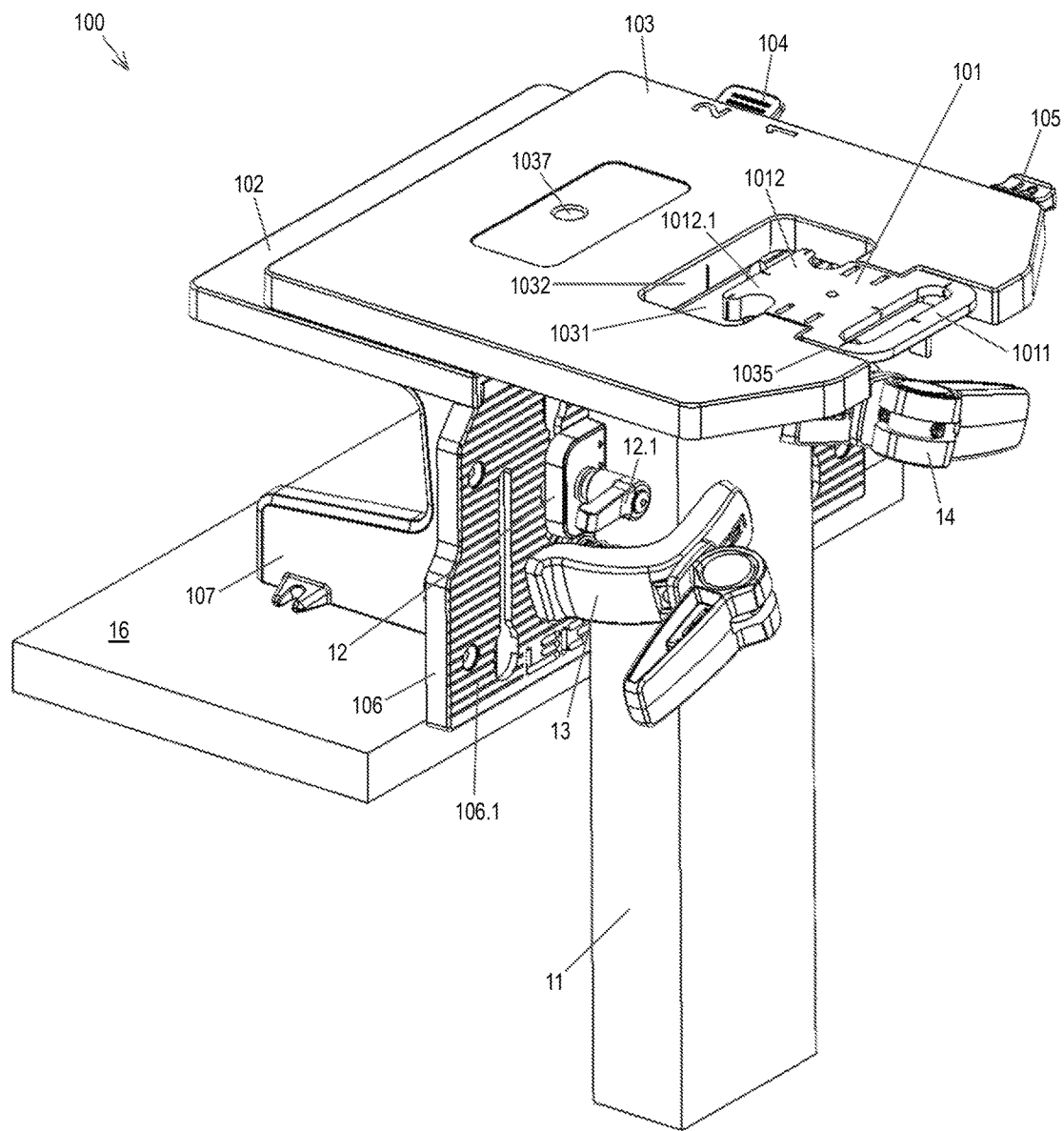
FIG. 3B is a front left perspective view of the mortise and tenon jig of FIG. 3A.
Figure 8:
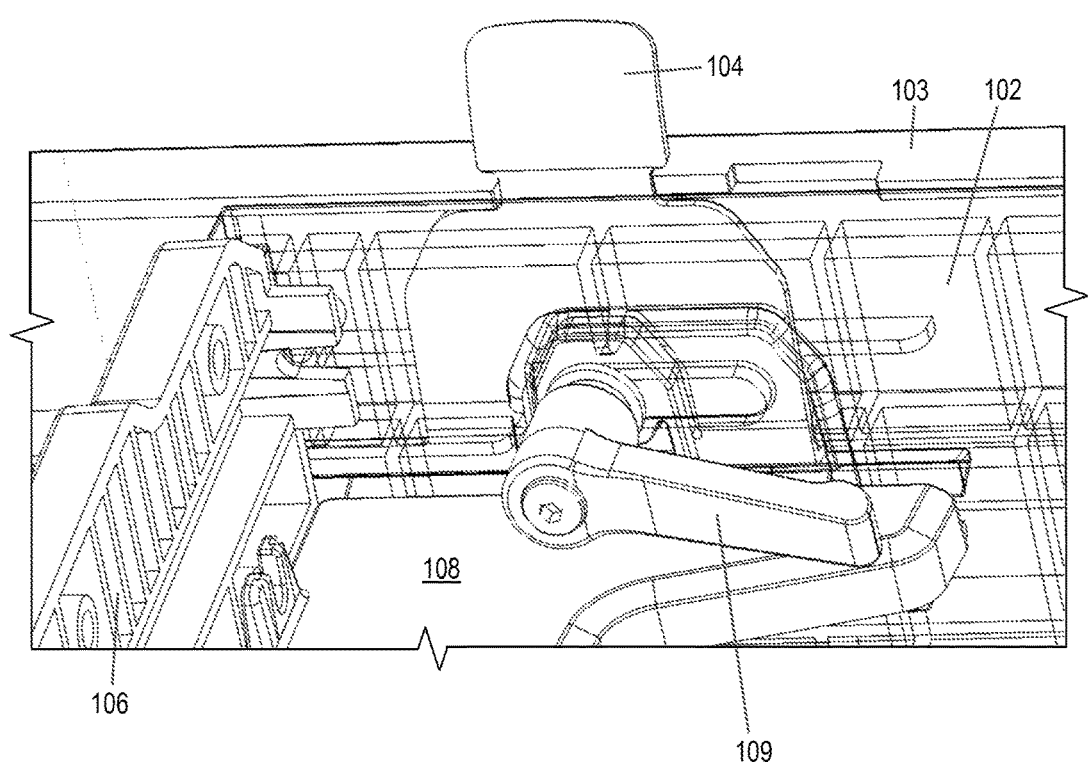
FIG. 8 is a partial bottom perspective view of the mortise and tenon jig of FIG. 1A.
Figure 9A:
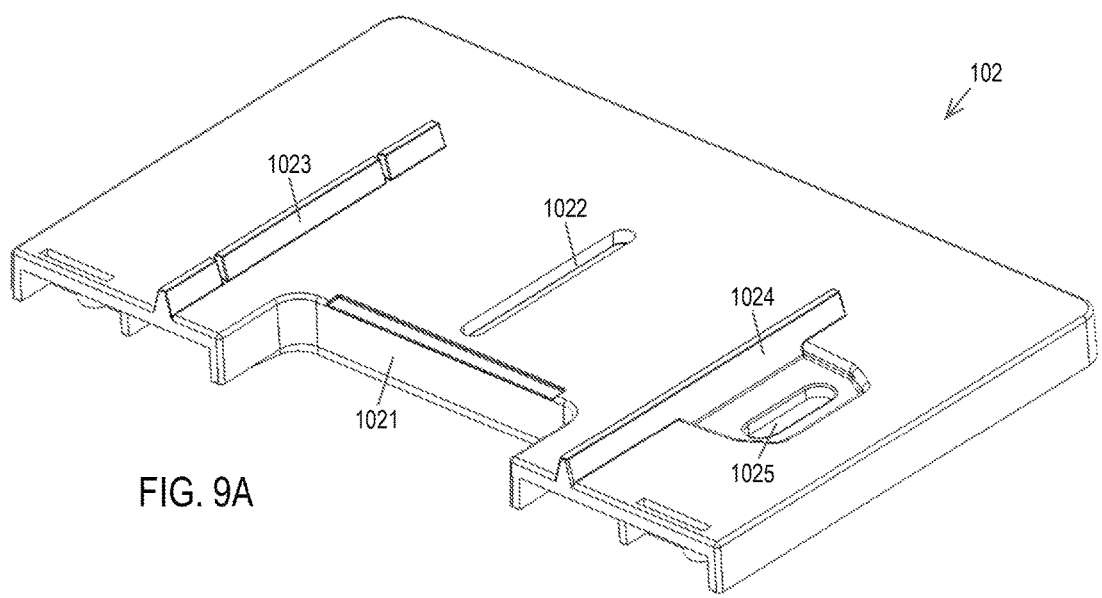
FIG. 9A is a top perspective view of a base plate of the mortise and tenon jig of FIG. 1A.
Figure 9B:
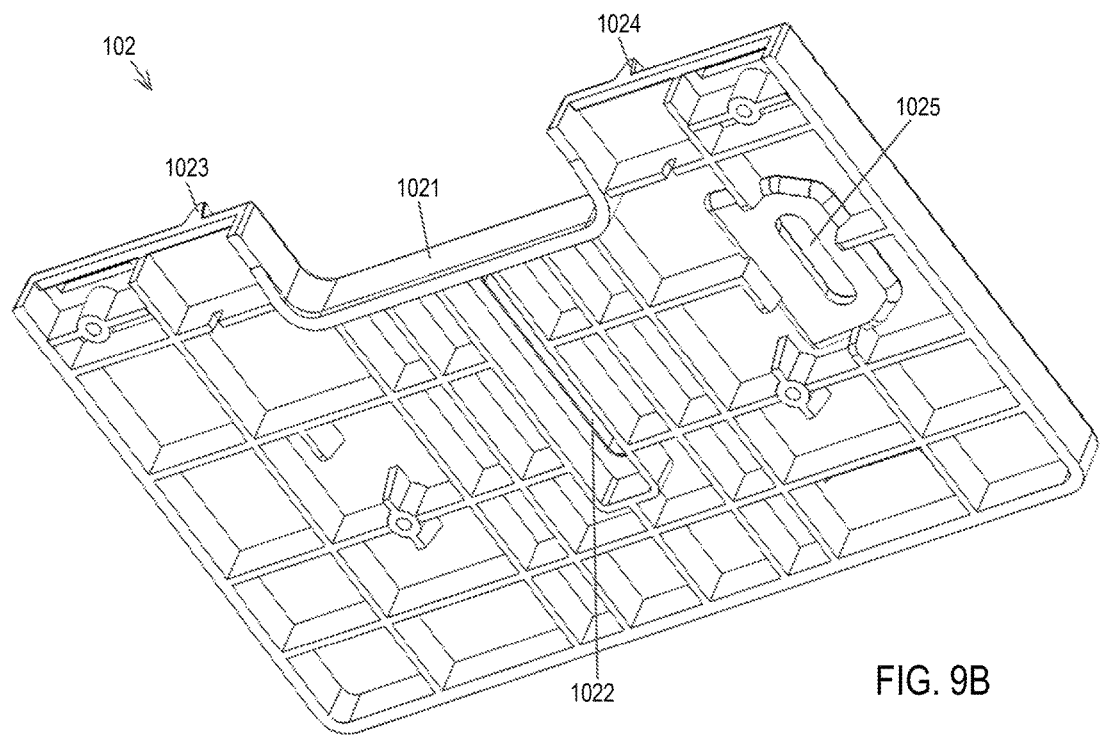
FIG. 9B is a bottom perspective view of the base plate of FIG. 9A.
Figure 10A:
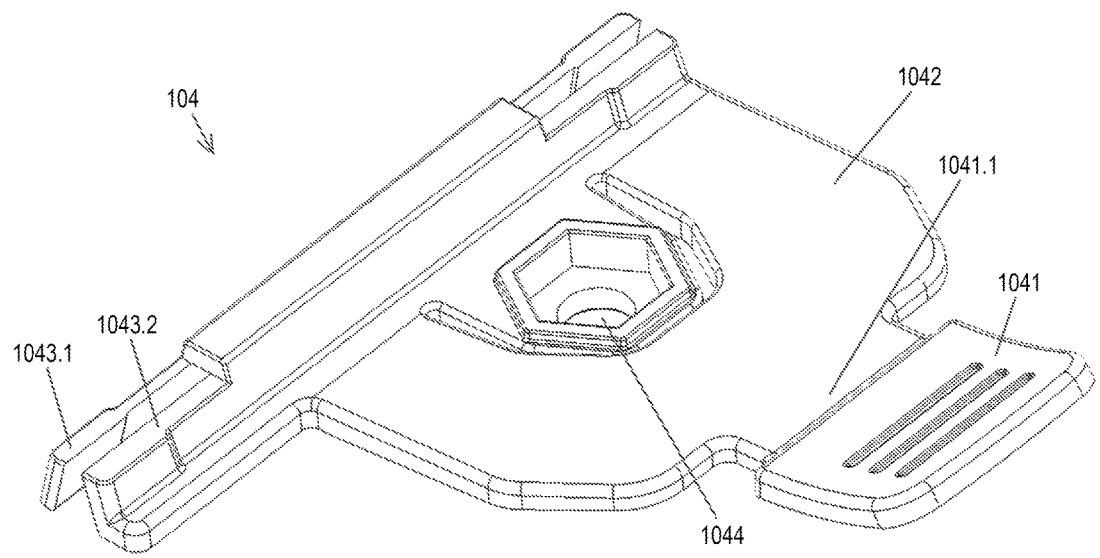
FIG. 10A is a top perspective view of a router support plate lever of the mortise and tenon jig of FIG. 1A.
Figure 10B:
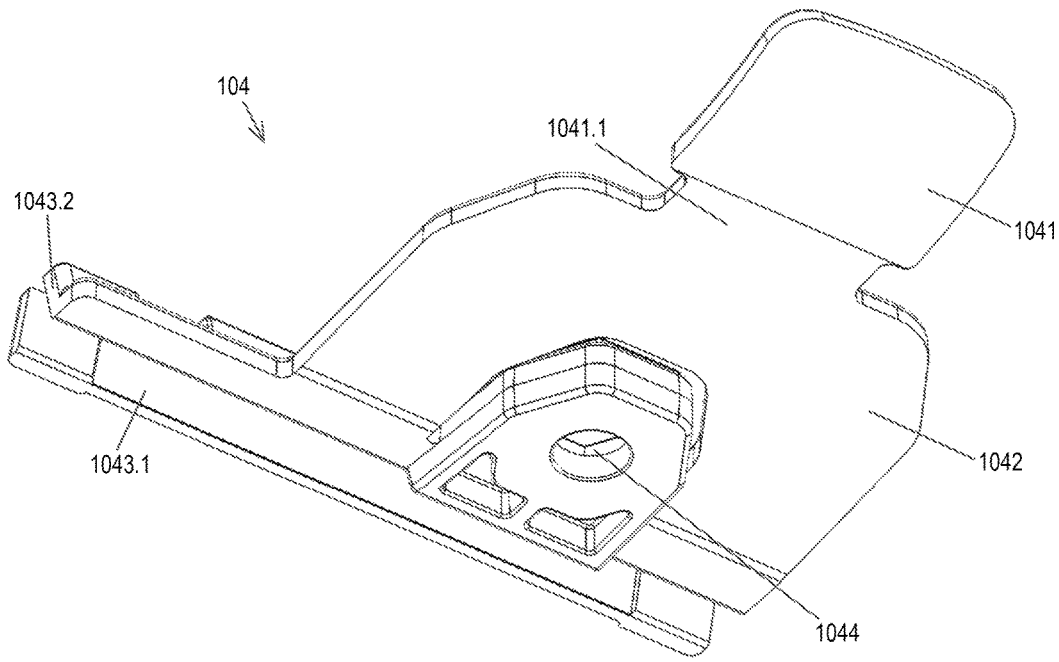
FIG. 10B is a bottom perspective view of the router support plate lever of FIG. 10A.
Figure 11:
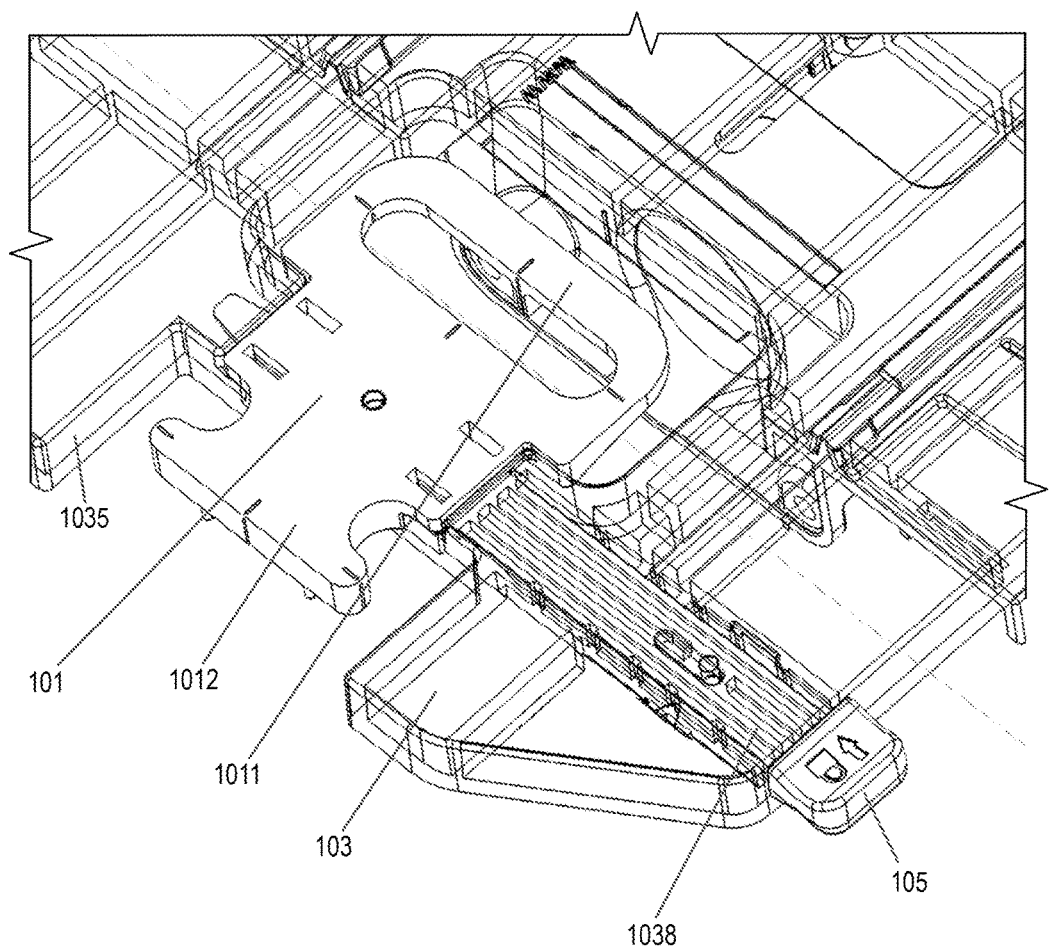
FIG. 11 is a top partial perspective view of the mortise and tenon jig of FIG. 1A.
Figure 12A:
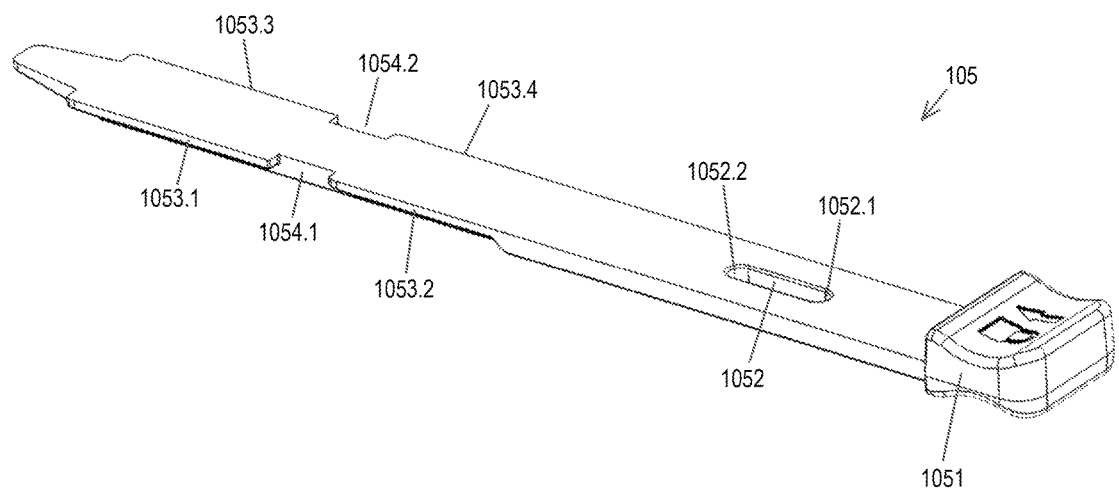
FIG. 12A is a top perspective view of a guide lock member of the mortise and tenon jig of FIG. 1A.
Figure 12B:
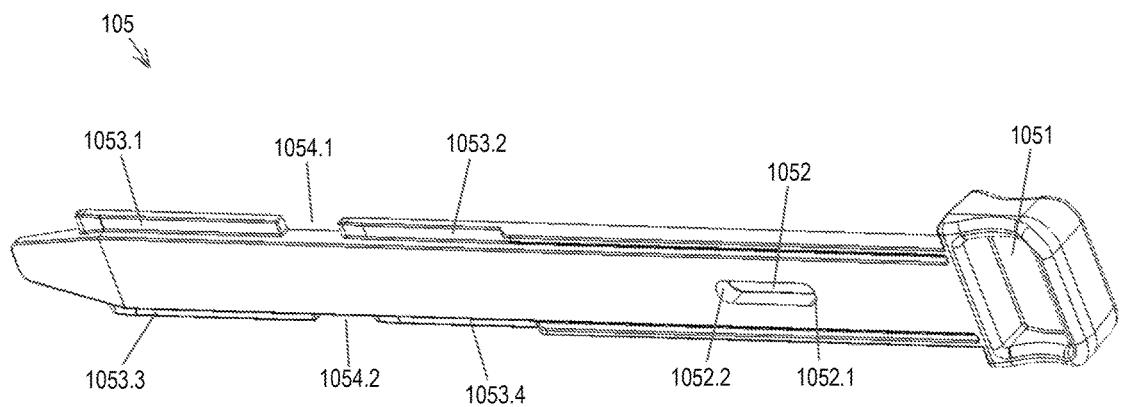
FIG. 12B is a bottom perspective view of the guide lock member of FIG. 12A.

In some embodiments, to finish cutting waste material adjacent to the tenon, the router support plate 103 is moved from a first position (as shown in FIGS. 2A and 2B) to a second position (as shown in FIGS. 3A and 3B) using router support plate lever 104. The router support plate lever 104 (see FIGS. 10A and 10B) is located between and interacts with the base plate 102 and the router support plate 103. As shown in FIG. 8 (where the base plate 102 is shown transparent), the plate securing lever 109 (extending through hole 1025 of base plate 102) attaches to hole 1044 of the router support plate lever 104 such that, after the router support plate 103 is adjusted for depth along the Y-axis relative to base plate 102, tightening the plate securing lever 109 secures the base plate 102 and the router support plate lever 104. The router support plate 103 may include a rib 1036.2 above the fastener head that is inserted into hole 1044. To secure the router support plate 103, the neck 1041.1 of the router support plate lever 104 engages the first notch 1039.1 when the router support plate 103 is in the first position, and engages the second notch 1039.2 when the router support plate 103 is in the second position. The neck 1041.1 extends between the main body 1042 of the router support plate lever 104 and the handle 1041. The router support plate 103 includes an inside rib 1036.1 and an outside rib 1036.3 (see FIGS. 5A and 5B) that each include a tapered inner surface for interfacing with the outer surfaces of the longitudinal members 1043.1 and 1043.2 of the router support plate lever 104. In particular, the outer surface of first longitudinal member 1043.1 interfaces with the tapered surface of the inside rib 1036.1 and the second longitudinal member 1043.2 interfaces with the tapered surface of the outside rib 1036.3. The inner surfaces of the longitudinal members 1043.1 and 1043.2 of the router support plate lever 104 engage the outer tapered surfaces of the protrusion 1024 of the base plate 102 (see FIG. 9A).

After the router support plate 103 has moved to the second position (as shown in FIGS. 3A and 3B), the rear surface 1032 of the opening 1031 is approximately aligned with the location of the desired second face cheek of the tenon (i.e., the fourth side of the tenon). With the router support plate 103 in the second position, the guide bushing of router may use the rear surface 1032 of the opening 1031 as a template for cutting the fourth side of the tenon.

To move the router support plate 103 between the first and second positions, the handle 1041 is pressed downward to disengage the neck 1041.1 from the first notch 1039.1 or the second notch 1039.2. With the handle held down, the router support plate 103 can move along the Y-axis relative to the router support plate lever 104 such that the inner tapered surfaces of the ribs 1036.1 and 1036.3 slide along the outer surfaces of the longitudinal members 1043.1 and 1043.2. As shown in FIG. 13C, the longitudinal members 1043.1 and 1043.2 of the router support plate lever 104 are disposed between the ribs 1036.1 and 1036.3 and the protrusion 1024 of the base plate 102. The notches 1039.1 and 1039.2 limit the movement of the router support plate 103 and define the distance between the first position and the second position. In some examples, the distance between the first position and the second position is approximately 30 mm. The distance between the first position and the second position may be any appropriate length. In some embodiments, the router support plate lever 104 may include a biasing mechanism (including, for example, one or more of a detent, a spring, or any other appropriate mechanism) that biases the router support plate lever 104 upward such that the router support plate lever 104 will remain engaged in the first notch 1039.1 or the second notch 1039.2 (i.e., securing the router support plate 103 in the first position or the second position) unless the handle 1041 is pressed down. The biasing mechanism may be based on the shape of the router support plate lever 104 (see FIG. 13A) such that pressing the handle 1041 down causes a flex/deflection of the router support plate lever 104.

Figure 7:
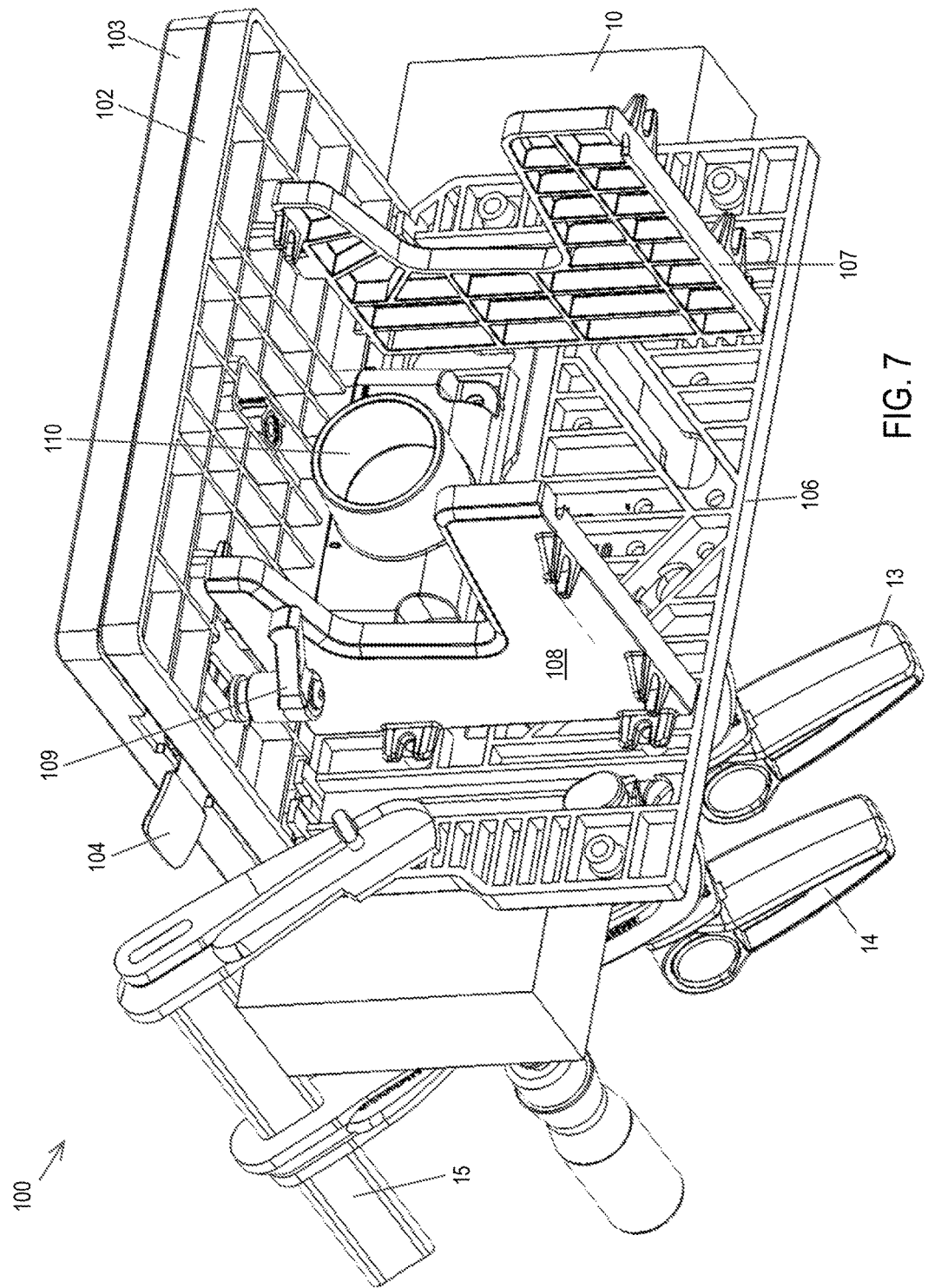
FIG. 7 is a bottom perspective view of the mortise and tenon jig of FIG. 1A.

On the rear side of the front mount 106, the mortise and tenon jig system 100 may include a dust collection adapter 110 (see FIG. 7). In some embodiments, the a notch 1021 of the base plate 102 provides sufficient clearance for the dust collection adapter 110.

Figure 14A:
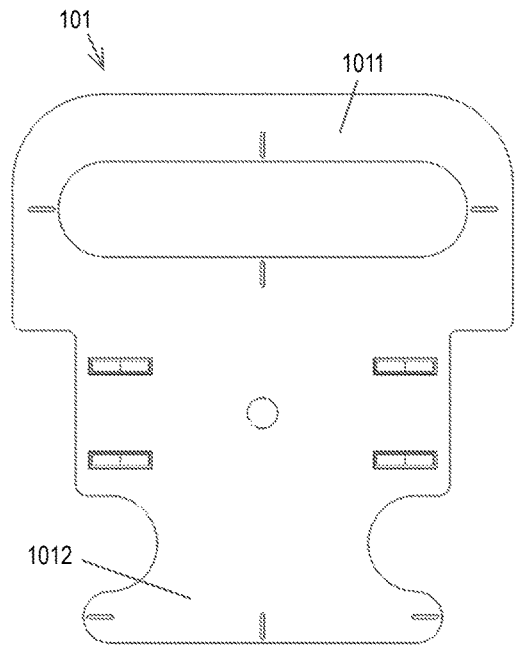
FIGS. 14A, 14B, and 14C are top views of alternative guides of the mortise and tenon jig of FIG. 1A.
Figure 14B:
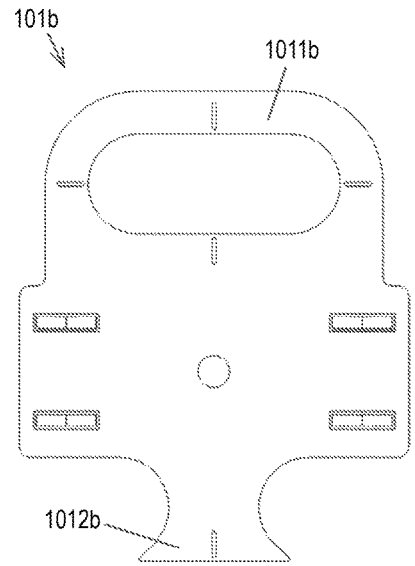
Figure 14C:
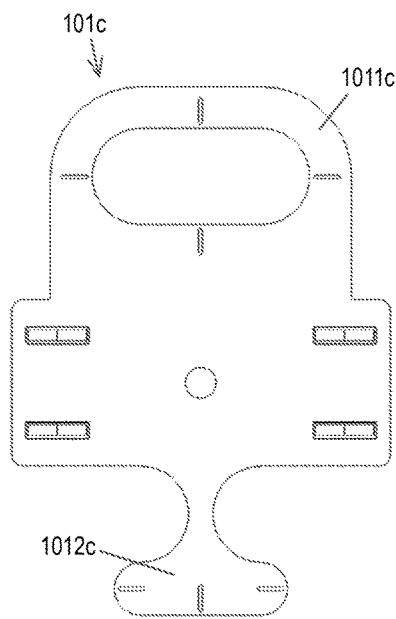

As shown in FIGS. 14A-14C, the mortise and tenon jig system 100 may be compatible with a plurality of different guides. For example, the guide 101 may be configured for creating mortises/tenons that are ⅜"×2". An alternative guide 101b may be configured for creating mortises/tenons that are ¼"×1". An alternative guide 101c may be configured for creating mortises/tenons that are ⅜"×1". Additional/alternative sizes for the mortise/tenon are contemplated such that guides with any appropriate size can be used with the mortise and tenon jig system 100.

The components of the mortise and tenon jig system 100 may be formed of materials including, but not limited to, aluminum, steel, thermoplastic, polyester, carbon composite, plastic, ABS plastic, machined aluminum, stainless steel, other plastic or polymer materials, other metallic materials, other composite materials, or other similar materials. Moreover, the components of the mortise and tenon jig system 100 may be attached to one another via suitable fasteners, which include, but are not limited to, screws, bolts, rivets or other mechanical or chemical fasteners.

In the following, further examples are described to facilitate understanding of aspects of the invention:

Example A. A mortise and tenon jig comprising:
a base plate;
a router support plate attached to an upper surface of the base plate, the router support plate comprising an opening; and
a guide attached to the router support plate, wherein:
the guide comprises a first end and a second end;
the first end comprises a mortise guide surface;
the second end comprises a tenon guide surface; and
the mortise and tenon jig comprises a first configuration where the mortise guide surface is aligned with the opening and a second configuration where the tenon guide surface is aligned with the opening.

Example B. The mortise and tenon jig of Example A or any of the preceding or subsequent examples, wherein the mortise guide surface comprises a hole that approximately corresponds to a desired mortise size.

Example C. The mortise and tenon jig of Example A or any of the preceding or subsequent examples, wherein the tenon guide surface comprises a protrusion that approximately corresponds to a desired tenon size.

Example D. The mortise and tenon jig of Example A or any of the preceding or subsequent examples, wherein, in the second configuration, the guide is rotated approximately 180° from the first configuration.

Example E. The mortise and tenon jig of Example A or any of the preceding or subsequent examples, wherein the guide comprises at least one of (i) a plurality of protrusions engaging the router support plate and (ii) a plurality of recesses for engaging the router support plate.

Example F. The mortise and tenon jig of Example A or any of the preceding or subsequent examples, wherein the router support plate is slidably attached to the base plate.

Example G. The mortise and tenon jig of Example F or any of the preceding or subsequent examples, wherein:
the router support plate comprises a first position and a second position relative to the base plate; and
the router support plate slides along an axis between the first position and the second position.

Example H. The mortise and tenon jig of Example G or any of the preceding or subsequent examples, wherein:
in the first position, a portion of the guide is approximately aligned with a work piece; and
in the second position, an edge of the opening is approximately aligned with the work piece.

Example I. The mortise and tenon jig of Example A or any of the preceding or subsequent examples, further comprising a front mount attached to a front edge of the base plate.

Example J. The mortise and tenon jig of Example I or any of the preceding or subsequent examples, wherein the front mount extends down from a lower surface of the base plate and comprises at least one clamp attached to a front surface of the front mount for securing a work piece.

Example K. The mortise and tenon jig of Example I or any of the preceding or subsequent examples, further comprising at least one side mount, wherein each side mount is attached to (i) a bottom surface of the base plate and (ii) a rear surface of the front mount.

Example L. The mortise and tenon jig of Example A or any of the preceding or subsequent examples, wherein:

the mortise guide surface comprises a hole that approximately corresponds to a desired mortise size;

the tenon guide surface comprises a protrusion that approximately corresponds to a desired tenon size; and the guide is replaceable with a second guide that comprises a different size hole and a different size protrusion.

Example M. A woodcutting jig for use with a handheld router, the jig comprising:

a base plate;

a router support plate attached to an upper surface of the base plate, the router support plate comprising an opening;

a front mount attached to a lower surface of the base plate, the front mount comprising a front surface acting as a reference surface;

a lock portion extending between the base plate and the router support plate, the lock portion comprising an unlocked configuration and a locked configuration; and a guide attached to the router support plate, wherein:

with the lock portion in the unlocked configuration, the router support plate can move relative to the base plate along an axis; and with the lock portion in the locked configuration, the router support plate and the base plate are secured to one another.

Example N. The woodcutting jig of Example M or any of the preceding or subsequent examples, further comprising a router support plate lever, wherein the router support plate lever moves the router support plate relative to the base plate along the axis between two discrete positions including a first position and a second position, and wherein the router support plate lever operates independently of the lock portion.

Example O. The woodcutting jig of Example M or any of the preceding or subsequent examples, wherein the guide comprises a tenon guide surface comprising a protrusion that approximately corresponds to a desired tenon size for a first work piece.

Example P. The woodcutting jig of Example M or any of the preceding or subsequent examples, wherein the guide further comprises a mortise end comprising a mortise guide surface.

Example Q. The woodcutting jig of Example P or any of the preceding or subsequent examples, further comprising:

a first configuration where the mortise end of the guide is aligned with the opening and a second configuration where a tenon end of the guide is aligned with the opening.

Example R. The woodcutting jig of Example Q or any of the preceding or subsequent examples, wherein, in the second configuration, the guide is rotated approximately 180° from the first configuration.

Example S. The woodcutting jig of Example N or any of the preceding or subsequent examples, wherein:

with the router support plate in the first position, a tenon guide surface is approximately aligned with a first work piece and the tenon guide surface comprises a template for cutting part of a tenon for the first work piece; and with the router support plate in the second position, an edge of the opening is approximately aligned with the first work piece and the edge of the opening comprises a template for cutting a remainder of the tenon for the first work piece.

Example T. A method for cutting a woodworking joint, the method comprising:

securing a first work piece to a jig, the jig comprising:

a base plate;

a router support plate attached to an upper surface of the base plate, the router support plate comprising an opening; and a guide attached to the router support plate, wherein:

the guide comprises a first end and a second end; and the jig comprises a first configuration where the first end of the guide is approximately aligned with the opening and a second configuration where the second end of the guide is approximately aligned with the opening;

cutting a mortise in the first work piece with the jig in the first configuration;

removing the guide from the router support plate;

attaching the guide to the router support plate in the second configuration;

securing a second work piece to the jig; and cutting waste material of the second work piece to form at least a portion of a tenon with the jig in the second configuration.

Example U. The method of Example T or any of the preceding or subsequent examples, wherein cutting the mortise in the first work piece comprises moving a handheld router that follows a template based on a hole in the first end of the guide.

Example V. The method of Example U or any of the preceding or subsequent examples, wherein a guide bushing of the handheld router follows the template in the first end of the guide.

Example W. The method of Example T or any of the preceding or subsequent examples, wherein cutting waste material of the second work piece to form at least a portion of a tenon comprises moving a handheld router that follows a template based on a protrusion at the second end of the guide.

Example X. The method of Example T or any of the preceding or subsequent examples, wherein, after removing the guide from the router support plate and before attaching the guide to the router support plate in the second configuration, the method further comprises rotating the guide approximately 180°.

Example Y. The method of Example T or any of the preceding or subsequent examples, further comprising:

adjusting a location of the router support plate relative to the base plate along an axis to align the guide with a desired location of at least one of the first work piece and the second work piece; and securing the router support plate relative to the base plate.

Example Z. The method of Example T or any of the preceding or subsequent examples, wherein:

the router support plate comprises a first position and a second position relative to the base plate; and after cutting waste material of the second work piece to form at least a portion of a tenon with the jig in the second configuration, the method further comprises sliding the router support plate relative to the base plate from the first position to the second position along an axis.

Example AA. The method of Example Z or any of the preceding or subsequent examples, further comprising:

when the router support plate is in the second position, cutting a remainder of the waste material of the second work piece to form the tenon.

Example AB. The method of Example AA or any of the preceding or subsequent examples, wherein cutting a remainder of the waste material of the second work piece to form the tenon comprises moving a handheld router that follows at least one edge of the opening.

Example AC. A method for cutting a woodworking joint, the method comprising:

securing a work piece to a jig, the jig comprising a base to which the work piece is secured and a router support;

moving the router support relative to the base along a first axis to align the router support relative to the work piece;

securing a tenon guide in an opening of the router support, the tenon guide comprising a first tenon guide surface, the opening comprising a second tenon guide surface;

when the first tenon guide surface is aligned with an intended location for a first portion of a tenon, using a router to form the first portion of the tenon in the work piece while supporting the router on the router support and guiding movement of the router using the first tenon guide surface;

moving the router support along the first axis to align the second tenon guide surface with an intended location for a second portion of the tenon; and when the second tenon guide surface is aligned with the intended location for the second portion of the tenon, using the router to form the second portion of the tenon in the work piece while supporting the router on the router support and guiding the movement of the router using the second tenon guide surface.

Example AD. The method of Example AC or any of the preceding or subsequent examples, further comprising:

securing a second work piece to the jig;

securing a mortise guide in the opening of the router support, the mortise guide comprising a mortise guide surface; and when the mortise guide surface is aligned with an intended location for a mortise, using the router to form the mortise in the second work piece while supporting the router on the router support and guiding the movement of the router using the mortise guide surface.

Example AE. The method of Example AD or any of the preceding or subsequent examples, wherein:

the tenon guide comprises a protrusion and the first tenon guide surface is an outer surface of the protrusion; and the mortise guide comprises a hole and the mortise guide surface is an inner surface of the hole.

Example AF. The method of Example AD or any of the preceding or subsequent examples, wherein the tenon guide is at a first end of a guide portion and the mortise guide is at a second end of the guide portion.

Example AG. The method of Example AF or any of the preceding or subsequent examples, further comprising rotating the guide portion approximately 180° to switch between a mortise configuration and a tenon configuration.

Example AH. The method of Example AC or any of the preceding or subsequent examples, further comprising engaging a plate securing lever to constrain the router support relative to the base.

Example AI. The method of Example AC or any of the preceding or subsequent examples, wherein moving the router support along the first axis between (i) the intended location for the first portion of the tenon and (ii) the intended location for the second portion of the tenon comprises moving a router support plate lever.

Example AJ. The method of Example AI or any of the preceding or subsequent examples, wherein the router support plate lever engages at least one notch in the router support.

Example AK. A method for cutting a woodworking joint, the method comprising:

securing a work piece to a jig, the jig comprising a base to which the work piece is secured and a router support;

moving the router support relative to the base along a first axis to align the router support relative to the work piece, and then locking a first lock to secure the router support in an aligned position;

when the router support is in the aligned position, using a router to form a first portion of a tenon in the work piece while supporting the router on the router support and guiding movement of the router using a first tenon guide surface;

unlocking a second lock, and, while the first lock is locked and the second lock is unlocked, moving the router support along the first axis a pre-defined distance to a second aligned position, and then locking the second lock;

when the router support is in the second aligned position, using the router to form a second portion of the tenon in the work piece while supporting the router on the router support and guiding the movement of the router using a second tenon guide surface.

Example AL. The method of Example AK or any of the preceding or subsequent examples, further comprising:

securing a second work piece to the jig;

moving the router support relative to the base along the first axis to align the router support relative to the second work piece;

securing a mortise guide to the router support, the mortise guide comprising a mortise guide surface; and using the router to form a mortise in the second work piece while supporting the router on the router support and guiding the movement of the router using a mortise guide surface.

Example AM. The method of Example AL or any of the preceding or subsequent examples, wherein:

the first tenon guide surface comprises an outer surface of a protrusion; and the mortise guide surface comprises an inner surface of a hole.

Example AN. The method of Example AL or any of the preceding or subsequent examples, wherein the first tenon guide surface is at a first end of a guide portion and the mortise guide surface is at a second end of the guide portion.

Example AO. The method of Example AN or any of the preceding or subsequent examples, further comprising rotating the guide portion approximately 180° to switch between a mortise configuration and a tenon configuration.

Example AP. The method of Example AK or any of the preceding or subsequent examples, wherein the second lock comprises a plate securing lever to constrain the router support relative to the base.

Example AQ. The method of Example AK or any of the preceding or subsequent examples, wherein moving the router support along the first axis between (i) the aligned position for the first portion of the tenon and (ii) the second aligned position for the second portion of the tenon comprises moving a router support plate lever.

Example AR. The method of Example AQ or any of the preceding or subsequent examples, wherein the router support plate lever engages at least one notch in the router support.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A mortise and tenon jig comprising:
   a base plate;
   a router support plate attached to an upper surface of the base plate, the router support plate comprising an opening; and
   a guide attached to the router support plate, wherein:
   the guide comprises a first end and a second end;
   the first end comprises a mortise guide surface;
   the second end comprises a tenon guide surface; and
   the mortise and tenon jig comprises a first configuration where the mortise guide surface is aligned with the opening and a second configuration where the tenon guide surface is aligned with the opening.

2. The mortise and tenon jig of claim 1, wherein:
   the mortise guide surface comprises a hole that approximately corresponds to a desired mortise size; and
   the tenon guide surface comprises a protrusion that approximately corresponds to a desired tenon size.

3. The mortise and tenon jig of claim 1, wherein, in the second configuration, the guide is rotated approximately 180° from the first configuration.

4. The mortise and tenon jig of claim 1, wherein the guide comprises at least one of (i) a plurality of protrusions engaging the router support plate and (ii) a plurality of recesses for engaging the router support plate.

5. The mortise and tenon jig of claim 1, wherein the router support plate is slidably attached to the base plate.

6. The mortise and tenon jig of claim 5, wherein:
   the router support plate comprises a first position and a second position relative to the base plate; and
   the router support plate slides along an axis between the first position and the second position.

7. The mortise and tenon jig of claim 6, wherein:
   in the first position, a portion of the guide is approximately aligned with a work piece; and
   in the second position, an edge of the opening is approximately aligned with the work piece.

8. The mortise and tenon jig of claim 1, further comprising a front mount attached to a front edge of the base plate.

9. The mortise and tenon jig of claim 1, wherein:
   the mortise guide surface comprises a hole that approximately corresponds to a desired mortise size;
   the tenon guide surface comprises a protrusion that approximately corresponds to a desired tenon size; and
   the guide is replaceable with a second guide that comprises a different size hole and a different size protrusion.

10. A method for cutting a woodworking joint, the method comprising:
    securing a first work piece to a jig, the jig comprising:
      a base plate;
      a router support plate attached to an upper surface of the base plate, the router support plate comprising an opening; and
      a guide attached to the router support plate, wherein:
      the guide comprises a first end and a second end; and
      the jig comprises a first configuration where the first end of the guide is approximately aligned with the opening and a second configuration where the second end of the guide is approximately aligned with the opening;
    cutting a mortise in the first work piece with the jig in the first configuration;
    removing the guide from the router support plate;
    attaching the guide to the router support plate in the second configuration;
    securing a second work piece to the jig; and
    cutting waste material of the second work piece to form at least a portion of a tenon with the jig in the second configuration.

11. The method of claim 10, wherein cutting the mortise in the first work piece comprises moving a handheld router that follows a template based on a hole in the first end of the guide.

12. The method of claim 10, wherein cutting waste material of the second work piece to form at least a portion of a tenon comprises moving a handheld router that follows a template based on a protrusion at the second end of the guide.

13. The method of claim 10, wherein, after removing the guide from the router support plate and before attaching the guide to the router support plate in the second configuration, the method further comprises rotating the guide approximately 180°.

14. The method of claim 10, further comprising:
    adjusting a location of the router support plate relative to the base plate along an axis to align the guide with a desired location of at least one of the first work piece and the second work piece; and
    securing the router support plate relative to the base plate.

15. The method of claim 10, wherein:
    the router support plate comprises a first position and a second position relative to the base plate;
    after cutting waste material of the second work piece to form at least a portion of a tenon with the jig in the second configuration, the method further comprises sliding the router support plate relative to the base plate from the first position to the second position along an axis; and
    when the router support plate is in the second position, cutting a remainder of the waste material of the second work piece to form the tenon.

16. A method for cutting a woodworking joint, the method comprising:
    securing a work piece to a jig, the jig comprising a base to which the work piece is secured and a router support;
    moving the router support relative to the base along a first axis to align the router support relative to the work piece;
    securing a tenon guide in an opening of the router support, the tenon guide comprising a first tenon guide surface, the opening comprising a second tenon guide surface;
    when the first tenon guide surface is aligned with an intended location for a first portion of a tenon, using a router to form the first portion of the tenon in the work piece while supporting the router on the router support and guiding movement of the router using the first tenon guide surface;
    moving the router support along the first axis to align the second tenon guide surface with an intended location for a second portion of the tenon; and
    when the second tenon guide surface is aligned with the intended location for the second portion of the tenon, using the router to form the second portion of the tenon in the work piece while supporting the router on the router support and guiding the movement of the router using the second tenon guide surface.

17. The method of claim 16, further comprising:
securing a second work piece to the jig;
securing a mortise guide in the opening of the router support, the mortise guide comprising a mortise guide surface; and
when the mortise guide surface is aligned with an intended location for a mortise, using the router to form the mortise in the second work piece while supporting the router on the router support and guiding the movement of the router using the mortise guide surface.

18. The method of claim 17, wherein the tenon guide is at a first end of a guide portion and the mortise guide is at a second end of the guide portion.

19. The method of claim 16, further comprising engaging a plate securing lever to constrain the router support relative to the base.

20. The method of claim 16, wherein moving the router support along the first axis between (i) the intended location for the first portion of the tenon and (ii) the intended location for the second portion of the tenon comprises moving a router support plate lever.

\* \* \* \* \*